United States Patent
Kass

(10) Patent No.: US 8,478,064 B2
(45) Date of Patent: Jul. 2, 2013

(54) SELECTIVE DIFFUSION OF FILTERED EDGES IN IMAGES

(75) Inventor: Michael Kass, Berkeley, CA (US)

(73) Assignee: Pixar, Emeryville, CA (US)

( * ) Notice: Subject to any disclaimer, the term of this patent is extended or adjusted under 35 U.S.C. 154(b) by 202 days.

(21) Appl. No.: 13/009,805

(22) Filed: Jan. 19, 2011

(65) Prior Publication Data

US 2011/0229029 A1 Sep. 22, 2011

Related U.S. Application Data

(60) Provisional application No. 61/296,448, filed on Jan. 19, 2010.

(51) Int. Cl.
*G06T 5/001* (2006.01)

(52) U.S. Cl.
USPC .............................. 382/264; 382/260; 382/263

(58) Field of Classification Search
USPC ................. 382/132, 128, 130, 199, 168, 260, 382/263, 264, 255; 356/218; 250/208.1, 214 AL; 128/925
See application file for complete search history.

(56) References Cited

U.S. PATENT DOCUMENTS

| | | | | |
|---|---|---|---|---|
| 5,598,481 A * | 1/1997 | Nishikawa et al. | ........... | 382/130 |
| 5,666,434 A * | 9/1997 | Nishikawa et al. | ........... | 382/128 |
| 5,673,332 A * | 9/1997 | Nishikawa et al. | ........... | 382/128 |
| 5,740,268 A * | 4/1998 | Nishikawa et al. | ........... | 382/132 |
| 6,774,988 B2 * | 8/2004 | Stam et al. | ..................... | 356/218 |
| 2004/0012720 A1 | 1/2004 | Alvarez | | |
| 2008/0088857 A1 | 4/2008 | Zimmer et al. | | |
| 2008/0181507 A1 | 7/2008 | Gope et al. | | |
| 2008/0266413 A1 | 10/2008 | Cohen et al. | | |
| 2009/0317014 A1 | 12/2009 | Porikli | | |

\* cited by examiner

*Primary Examiner* — Anh Do
(74) *Attorney, Agent, or Firm* — Kilpatrick Townsend & Stockton LLP

(57) ABSTRACT

An edge-preserving diffusion filter maintains the sharp edges in images while smoothing out image noise. An edge-preserving diffusion filter applies an edge-preserving smoothing filter to an image to form a filtered image. The modified image is then blurred by a blurring filter to form a blurred image. The modified image and the blurred image are blended together to form an output image based on an error metric associated with each pixel. The edge-preserving diffusion filter may be utilized to perform a multilevel decomposition of the image. The edge-preserving diffusion filter may be applied to an unfiltered image to produce a base image. The difference between the unfiltered image and the base image defines a detail image. The detail image may be used as the input for recursively generating additional levels of detail. The multilevel decomposition may utilize filter kernels associated with different contrast levels for each iteration.

30 Claims, 16 Drawing Sheets

600

605

610

SELECTIVE DIFFUSION OF FILTERED EDGES IN IMAGES

CROSS-REFERENCE TO RELATED APPLICATIONS

This application is claims priority to U.S. Provisional Patent Application No. 61/296,448, filed Jan. 19, 2010, and entitled "Selective Diffusion of Filtered Edges in Images," which is incorporated by reference herein for all purposes. This application is related to U.S. patent application Ser. No. 12/493,207, filed Jun. 28, 2009, entitled "Smoothed Local Histogram Filters for Computer Graphics"; and U.S. patent application Ser. No. 12/493,208, filed Jun. 28, 2009, entitled "Painterly Filtering"; both of which are incorporated by reference herein for all purposes.

BACKGROUND

The present invention relates to the field of computer graphics, and in particular to methods and apparatus for analyzing and filtering of still images, video, and other one-dimensional, two-dimensional, three-dimensional, four-dimensional, and higher-dimensional data sets to produce visual effects.

A global image histogram specifies the number of pixels in a complete image or video sequence having a specific color, tone, intensity, or other attribute value, or falling within a specific range of color, tone, intensity, or other attribute values. An image histogram specifies the number of pixels in an image having a specific color, tone, intensity, or other attribute value, or falling within a specific range of color, tone, intensity, or other attribute values.

A local image histogram specifies the distribution or quantity of pixel values within a specific portion of an image or video, such as within a given distance from a specified pixel, referred to as a pixel's neighborhood. Local image histograms contain a great deal of information useful for applications in computer graphics, computer vision and computational photography. A local image histogram specifies the distribution or quantity of values within a specific portion of an image or video, such as within a given distance from a specified pixel, referred to as a pixel's neighborhood. Typically, each pixel in an image may its own local histogram, because each pixel includes a different set of pixels in its respective neighborhood.

Local image histograms contain a great deal of information useful for applications in computer graphics, computer vision and computational photography. Local histograms often show multiple peaks or modes, due to the presence of different surfaces. Separating out the properties of these modes enables sophisticated non-linear image transformations including noise reduction, edge-preserving smoothing, segmentation and stylization.

However, prior techniques for determining a local histogram are computationally difficult and expensive. One prior approach to computing a local histogram is to determine the distribution of pixel values in the neighborhood surrounding a target pixel. However, this approach is computationally expensive for large neighborhoods. For square or rectangular neighborhoods, histogram computations can be accelerated by exploiting the overlap of neighborhoods for adjacent pixels. Unfortunately, square or rectangular neighborhoods have poor signal-processing characteristics and often exhibit clear visual artifacts due to anisotropy.

Moreover, once local histograms around one or more pixels are explicitly determined, many histogram-based operations are nonlinear. This prevents traditional acceleration techniques for large linear filters from being used, further increasing the overall computational expense.

Rather than explicitly determine local histograms around one or more pixels, other prior histogram techniques operate on the histogram indirectly. These prior techniques do not calculate a local histogram for a given pixel. Instead, they attempt to determine or estimate a particular property of attribute of the local histogram. For example, a prior mean-shift technique can identify the nearest local histogram mode, which is the nearest local histogram peak, for a given pixel without directly determining the local histogram for this pixel's neighborhood. However, prior techniques like the mean-shift technique are iterative and require multiple processing passes over the data set before converging to a solution. This increases the required time and computational expense. Moreover, these prior iterative techniques only identify the nearest local histogram mode or nearest local histogram peak. However, there are many applications that would benefit from knowledge of other local histogram modes. Unfortunately, these prior iterative techniques do nothing to identify any other local histogram modes.

BRIEF SUMMARY

An embodiment of the invention applies image filters based on local histograms or local histogram-based attributes to images. For example, an edge-preserving diffusion filter maintains the sharp edges in images while smoothing out image noise. In an embodiment, an edge-preserving diffusion filter applies an edge-preserving smoothing filter to an image to form a filtered image. The modified image is then blurred by a blurring filter to form a blurred image. The modified image and the blurred image are selectively blended together to form an output image. In an embodiment, the modified image and blurred image are blended on a per-pixel basis based on an error metric associated with each pixel. The error metric measures the different between a pixel in a modified image or a blurred image with respect to the unfiltered image. The output image may be used as an intermediate image for recursive processing by the edge-preserving diffusion filter. The neighborhood associated with the blurring filter may be varied over multiple iterations of the edge-preserving diffusion filter.

In a further embodiment, the edge-preserving diffusion filter may be utilized to perform a multilevel decomposition of the image. In this embodiment, the edge-preserving diffusion filter may be applied to an unfiltered image to produce a base image. The difference between the unfiltered image and the base image defines a detail image. The base image is saved. The detail image may be output or alternatively used as the input to the edge-preserving diffusion filter to produce a second base image at a higher level of detail. The difference between the second base image and the unfiltered image defines a second detail image at a higher level of detail. These detail image may be recursively processed for additional levels of detail. The result of this decomposition is one or more base images at one or more levels of detail and the detail image at the highest level of detail. In an embodiment, the multilevel decomposition may utilize filter kernels associated with different contrast levels for each iteration of the edge-preserving diffusion filter.

BRIEF DESCRIPTION OF THE DRAWINGS

The invention will be described with reference to the drawings, in which.

In the drawings, the use of identical reference numbers indicates identical elements.

DETAILED DESCRIPTION

Histogram Properties

Figure 1:
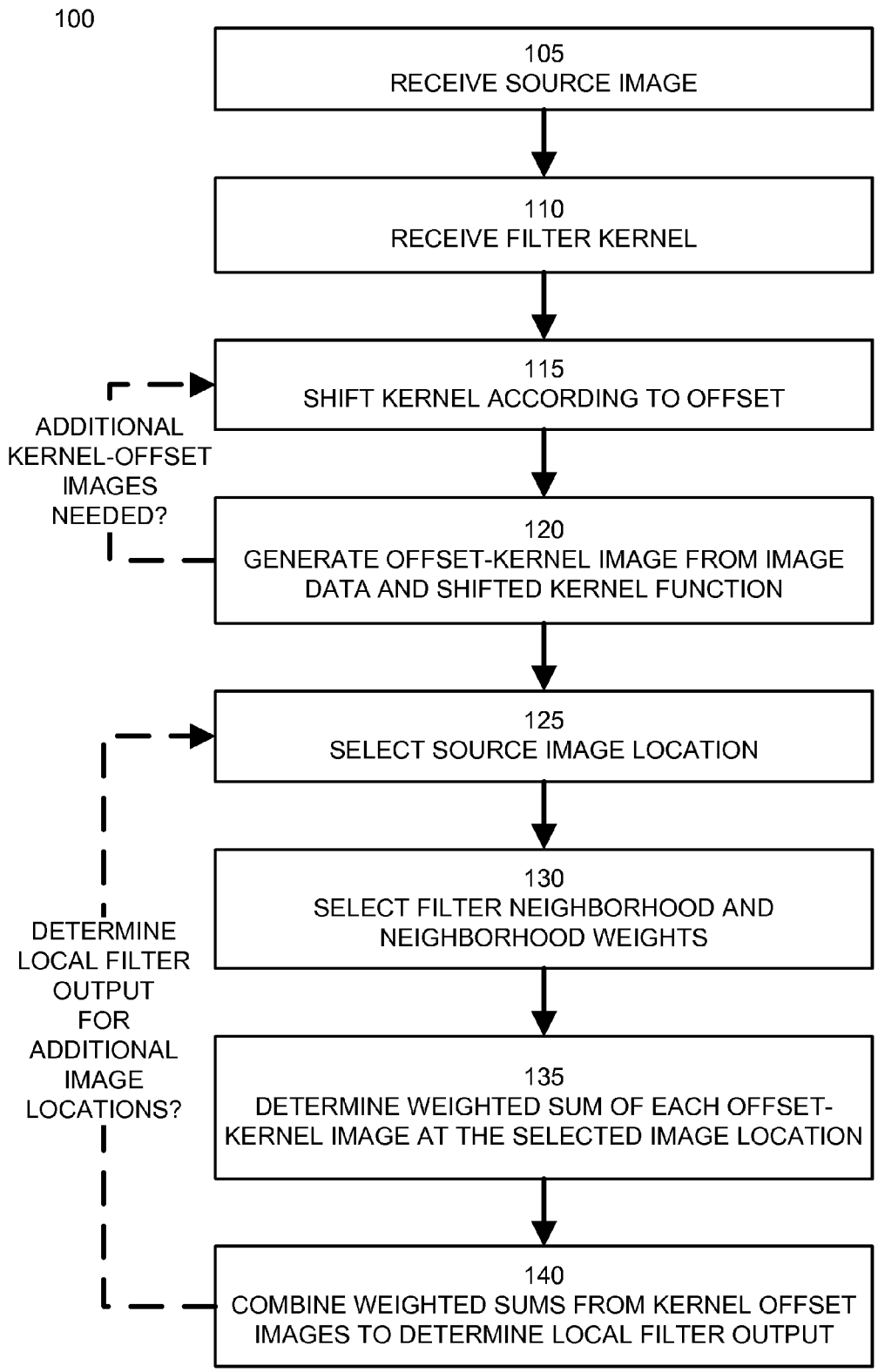
FIG. 1 illustrates a method of computing local histograms and local histogram-based attributes according to an embodiment of the invention.

The traditional histogram sorts data into a collection of bins, indicating the frequency with which the data falls into each bin. While this is convenient for exploratory data analysis, the discrete quantization of data into bins is artificial. From a signal processing point of view, embodiments of the invention examine a smoothed histogram. If $I_p$ is the image intensity at a point p, then the smoothed histogram of a neighborhood around the point can be written $$f_p(s) = \frac{1}{n}\sum_{i=1}^{n} K(s - I_{qi}) \quad (1)$$

where K is a smoothing kernel that integrates to one, n is the number of points in the neighborhood, and $q_i$ ranges over the pixels in the neighborhood of p. Note that if K is a unit-area box function and f(s) is sampled appropriately, this reduces to the traditional binned histogram.

Equation 1 has another important interpretation. If the pixel intensity values are considered to be samples from a random variable, then f is a popular estimate of the underlying probability density function. This method of estimating the probability density is most generally known as kernel density estimation, while in the pattern recognition literature, it has come to be known as the Parzen window technique.

Embodiments of the inventions can include a variety of possible smoothing kernels one could consider for K. In some implementations, it may be preferable to use a kernel that can never introduce new extrema in the course of smoothing, such as a Gaussian.

Whether f is considered to be a smoothed histogram or a probability density estimate, embodiments of the invention may have the influence of nearby pixels fall off gradually with distance. For this, an embodiment of the invention uses an all positive weighting function W with unit integral. The smoothed, locally-weighted histogram (or density estimate) can then be written $$\hat{f}_p(s) = K(s - I_{qi})W(p - q_i) \quad (2)$$

or as the convolution $$\hat{f}_p(s) = K(s - I_{qi}) \otimes W \quad (3)$$

The smoothed local histogram $\hat{f}_p$ reveals a great deal of information about a local image neighborhood. If it has a single peak or mode, then it is likely that the pixels in the neighborhood come from a similar origin. On the other hand, if the histogram has multiple modes, then the neighborhood probably contains pixels from two or more distinct populations. For visual effects including stylization, noise reduction, segmentation and other purposes, embodiments of the invention identify and characterize the local histogram modes. In particular, embodiments of the invention can identify attributes such as the number of local histogram modes, their values, their widths and the percentage of the population contained within each local histogram mode.

At a histogram mode, $\partial \hat{f}(s)/\partial s$ will vanish. Since only K depends on s, the derivative of the histogram can be written as $$D(p) = \frac{\partial \hat{f}_p(s)}{\partial s} = K'(s - I_{qi}) \otimes W.$$

(4)

Since K is a low-pass kernel, its derivative K' will also be band limited. As a result, embodiments of the invention can sample the derivative of the histogram D(p) at or above the Nyquist sampling rate without loss of information. Let $s_i, 1 \leq i \leq n$ be a set of samples of s over the relevant range at the Nyquist rate of K' or above. Then all the histogram modes can be identified from the functions $$D_i(p) = K'(I_p - s_i) \otimes W \quad (5)$$

Computing the functions $D_i(p)$ is straightforward and well suited to modern GPU hardware. For each i, an embodiment of the invention computes a lookup table $L_i$ that maps any intensity value $I_p$ to $K'(I_p - s_i)$. Then, the input image I is mapped through the lookup table and convolve the result with the spatial kernel W to get the function $D_i$.

Strictly speaking, to guarantee accurate results at the Nyquist rate, embodiments of the invention may use sinc interpolation. However, alternative embodiments may increase the sampling rate sufficiently such that linear interpolation in s is as accurate as desired. In that case, an embodiment of the invention may determine the local histogram modes ($\hat{f}_p$), by looking at each point p for zero crossings in $D_i(p)$ as i increases. If a negative-going zero crossing is found between $D_i(p)$ and $D_{i+1}(p)$ then there is a mode located approximately at $$s = s_i + \frac{D_i(p)}{D_i(p) - D_{i+1}(p)}(s_{i+1} - s_i). \quad (6)$$

Embodiments of invention may use a variety of different tonal filter kernels to determine the sampled values of many types of local histogram and histogram-based functions.

Figure 2A:
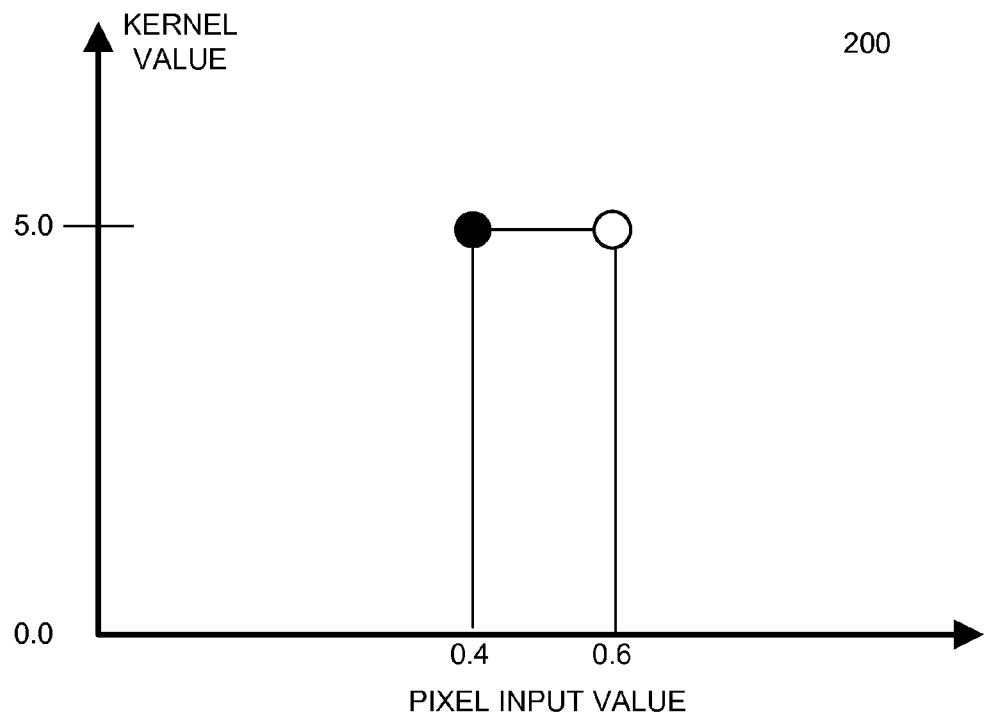
FIG. 2A-2F illustrate example tonal kernels and example resulting local histograms embodiments of the invention.

FIG. 2A illustrates a first example tonal filter kernel 200 suitable for use with embodiments of the invention. Tonal filter kernel 200 is a raw histogram intensity function. Tonal filter kernel 200 maps a pixel's scalar value, such as intensity or density, to a tonal filter kernel output value. In this example, tonal filter kernel 200 is centered around a pixel value of 0.5 and outputs a value of 5.0 for any pixel value from 0.4 up to, but not including, 0.6. The tonal filter kernel 200 outputs a value 0.0 for all other pixel values. In this example, the tonal filter kernel 200 integrates, or has an area of, 1.0.

Figure 2B:
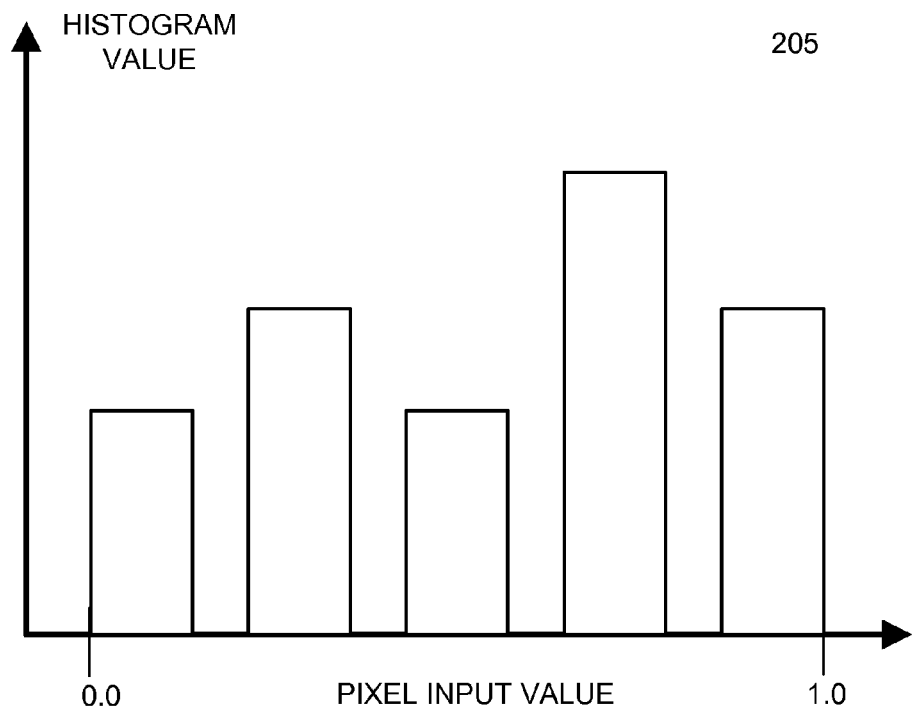

Using the example tonal filter kernel 200, an embodiment of the invention will produce discrete sample values of a local raw histogram. FIG. 2B illustrates an example sampled local raw histogram 205 produced using the example tonal filter kernel 200. In example sampled local raw histogram 205, the local histogram is represented by discrete values, with each value representing the proportion of pixel values in a local neighborhood falling within a range of intensities. Example sampled raw local histogram 205 is drawn as a discontinuous function because traditional histogram bins are non-overlapping.

Figure 2C:
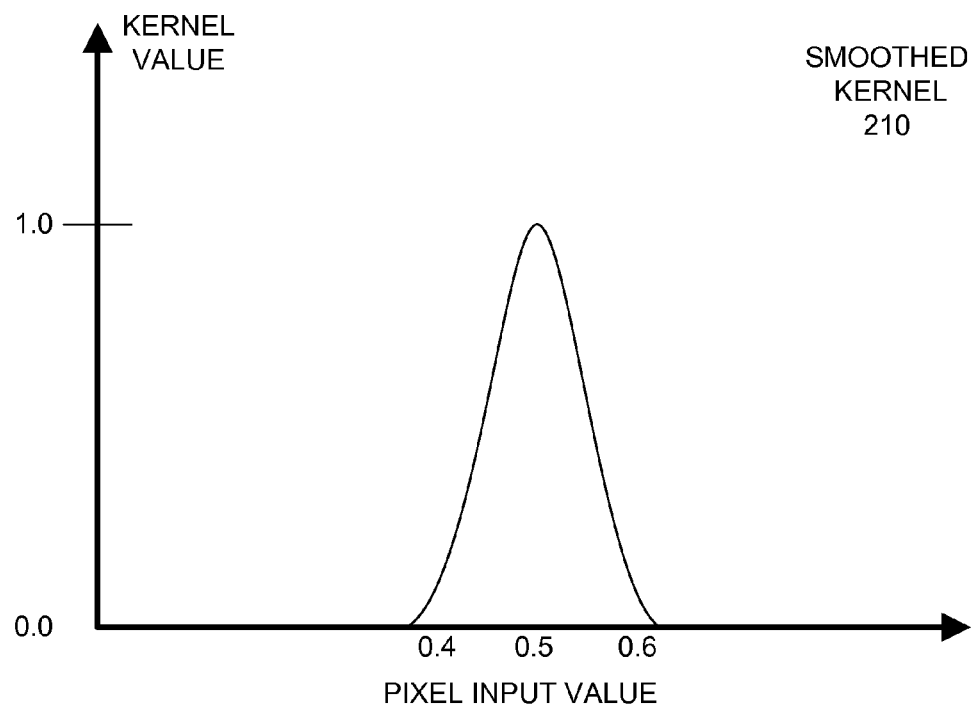

FIG. 2C illustrates an example smoothed tonal filter kernel 210. In an embodiment, the smoothed tonal filter kernel 210 may be a Gaussian distribution or another smooth function that integrates to one. In this example, tonal filter kernel 210 is centered around a pixel value of 0.5. Tonal filter kernel 210 outputs a value of 1.0 for any pixel value of 0.5. The output of tonal filter kernel 210 tapers down to 0 as the pixel intensity value moves away from 0.5 to 0.4 or 0.6. The output of tonal filter kernel 210 is 0 outside of the pixel values between 0.4 and 0.6. Using the above-described method with the tonal filter kernel 210 shown in FIG. 2C will result in sampled values of a local smoothed histogram function. Further embodiments of the invention may use any other type of tonal filter kernel, including tonal filter kernels having low-pass filtering characteristics.

Figure 2D:
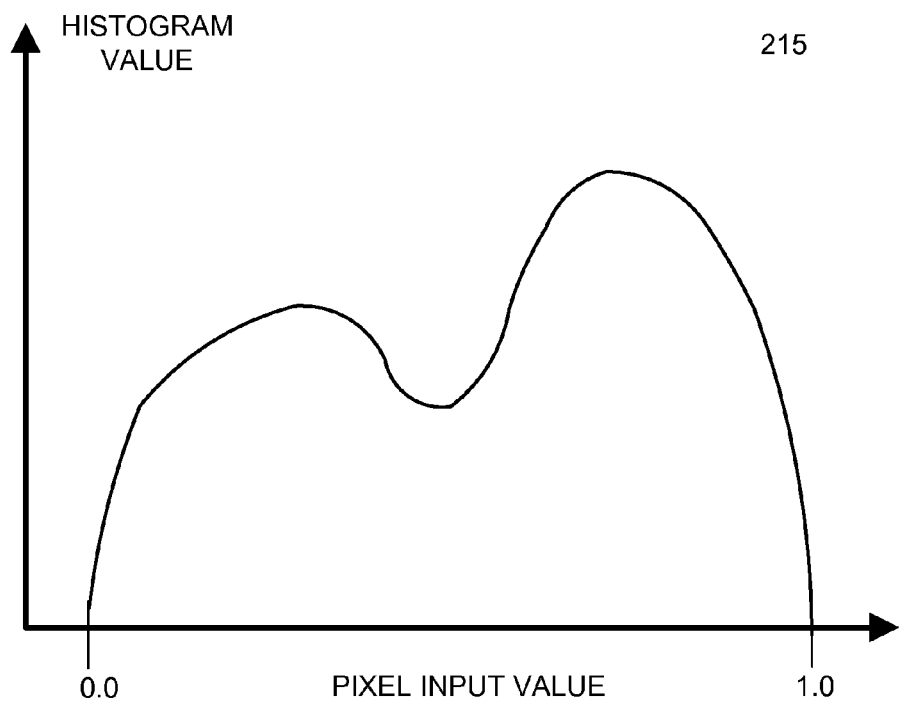

Using the example smoothed tonal filter kernel 210, an embodiment of the invention will produce discrete sample values of a local raw histogram. FIG. 2D illustrates an example sampled smoothed local histogram 215 produced using the example smoothed tonal filter kernel 210. Example smoothed local histogram 215 is a smoothed, locally weighted histogram corresponding with an example of $\hat{f}_p$ as described in equation 3. As shown in FIG. 2D, example smoothed local histogram 215 corresponds with a smoothed version of the sampled local histogram 205 shown in FIG. 2B.

Figure 2E:
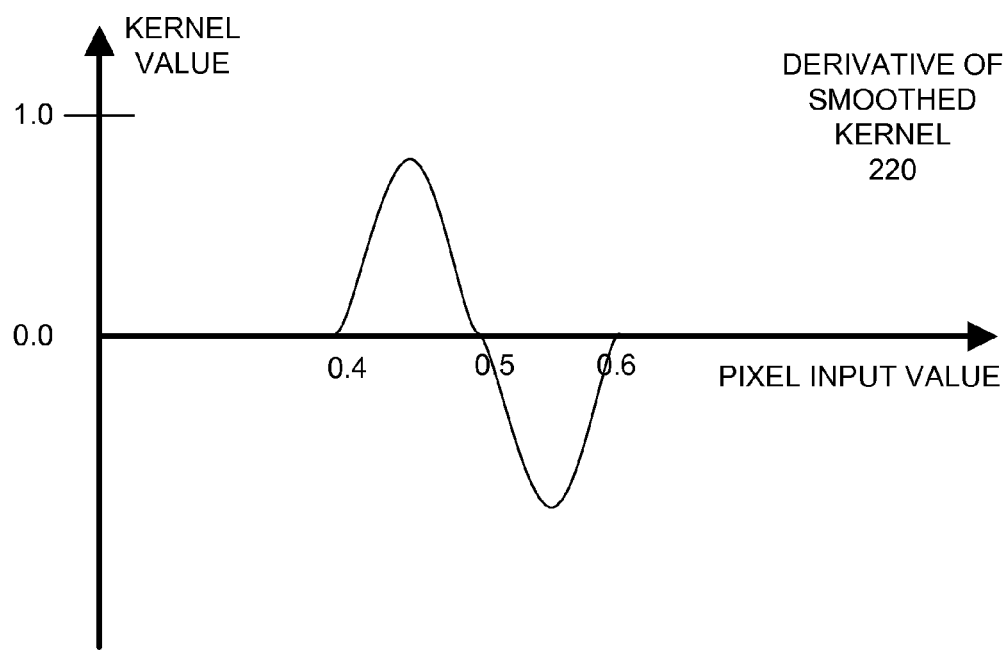

As discussed above, histogram modes may be found directly, without determining the underlying local histogram, by directly sampling a derivative of the histogram function using a derivative tonal filter kernel. FIG. 2E illustrates an example derivative tonal filter kernel 220. The derivative tonal filter kernel 220 is determined from the derivative of a tonal filter kernel, such as smoothed tonal filter kernel 210. The output of tonal filter kernel 220 is positive between pixel intensity values 0.4 and 0.5, negative between pixel intensity values 0.5 and 0.6, and zero at pixel intensity values 0.4, 0.5, and 0.6. These values correspond to the values of the derivative of the tonal filter kernel 210.

Embodiments of the invention may apply tonal filter kernel 220 to image data to sample values of the derivative of the local smoothed histogram. This determines values of the derivative of the smoothed local histogram without the need to first directly determine the smoothed local histogram itself. In general, if applying an arbitrary tonal filter kernel K results in the sampled version of a local histogram-based function F, then using the derivative of this tonal filter kernel K' will result in the sampled version of the derivative of the local histogram-based function (i.e. F'). As discussed below, using a derivative of a tonal filter kernel, such as the derivative 320 of the smoothed tonal filter kernel 300, can be used to find the peaks or histogram modes of the local histogram function.

For example, to find extrema in $\hat{f}_p$, an embodiment of the invention uses a look-up table 220 shaped like the derivative of the kernel K 210. Processing an image through this look-up table corresponding with the filter kernel 220 and smoothing gives a sample of the derivative of the smoothed histogram.

Figure 2F:
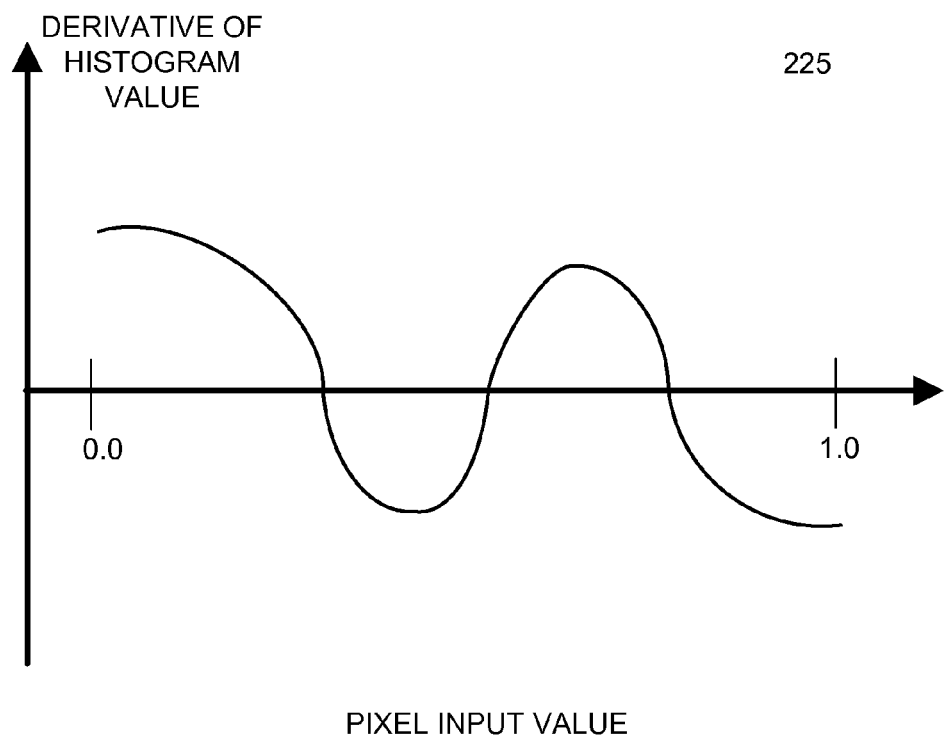

Using the example derivative filter kernel 22, an embodiment of the invention will produce discrete sample values of the derivative of the local histogram. FIG. 2F illustrates an example sampled derivative of the local histogram 225. As shown in FIG. 2F, the zero-crossings of the sampled derivative of the local histogram 225 correspond with the local extrema (e.g. the peaks and valleys) of the smoothed local histogram function 215 shown in FIG. 2D. Embodiments of the invention may use interpolation to identify the location of one or more zero crossings of the sampled derivative of the local histogram 225, thereby identifying the extrema in the smoothed local histogram.

Further details on the methods of computing local histogram and local histogram-based attributes, such as the derivatives or integrals of local histogram functions, are described in detail in U.S. patent application Ser. No. 12/493,207, filed Jun. 28, 2009, entitled "Smoothed Local Histogram Filters for Computer Graphics", and U.S. patent application Ser. No. 12/493,208, filed Jun. 28, 2009, entitled "Painterly Filtering," both of which are incorporated by reference herein for all purposes.

FIG. 1 and the examples of FIGS. 3A-3D illustrate these methods of computing local histograms and local histogram-based attributes according to an embodiment of the invention in more detail. FIG. 1 illustrates a method 100 of computing local histograms and local histogram-based attributes according to an embodiment of the invention.

As discussed above, a global image histogram specifies the distribution or quantity of colors, tones, intensities, or other scalar, vector, or tuple pixel values in still images or video. A global image histogram specifies the number of pixels in a complete image having a specific color, tone, intensity, or other attribute value, or falling within a specific range of color, tone, intensity, or other attribute values.

In contrast, a local image histogram specifies the distribution or quantity of pixel values within a specific portion of an image or video, such as within a given distance from a specified pixel, referred to as a pixel's neighborhood. Typically, each pixel in an image may its own local histogram, because each pixel includes a different set of pixels in its respective neighborhood. Method 100 may be used to determine the values of local histograms and local histogram-based functions, such as the derivatives or integrals of a local histogram.

Step 105 receives a set of image data, referred to as a source image. In this application, the term image is used to describe any type of one-dimensional, two-dimensional, three-dimensional, four-dimensional, or higher-dimensional data set. Examples of image data include still images and other two dimensional data sets, three-dimensional data sets such as video, animation, voxel data sets, and volumetric data structures. One dimension of the image or data set may correspond with time, such as a sequence of two-dimensional images arranged in time (represented as a three-dimensional data set) or a sequence of three dimensional voxel data arranged in time (represented as a four-dimensional data set). Image data may be generated by users using computer graphics content creation software, collected from the physical world using still or video cameras or other two-dimensional or three-dimensional imaging devices.

Each image include a plurality of pixels. In this application, the term pixel is used to describe any data element included in an image. A pixel or data element of an image includes one or more scalar, vector, tuple, or other values. An example of a pixel value is a scalar representing the intensity or other attribute, such as density, of the image at the pixel's location in the image. Another example of a pixel value may be a vector or tuple representing a color in a color space, such as RGB or HSV color space.

Step 110 receives a tonal filter kernel to be used to determine one or more local histograms or local histogram-based attribute values of the image source. As described in detail below, a wide variety of tonal filter kernels may be used to process the image. Embodiments of the invention may use any arbitrary function as a tonal filter kernel to map a pixel value to a corresponding tonal filter kernel function value. In a further embodiment, the tonal filter kernel integrates to a value of one.

As discussed above, FIGS. 2A, 2C, and 2E illustrate example tonal filter kernels suitable for use with embodiments of the invention. FIG. 2A illustrates a first example tonal filter kernel 200 suitable for use with embodiments of the invention. Tonal filter kernel 200 is a raw histogram intensity function. Tonal filter kernel 200 maps a pixel's scalar value, such as intensity or density, to a tonal filter kernel output value. In this example, tonal filter kernel 200 is centered around a pixel value of 0.5 and outputs a value of 5.0 for any pixel value from 0.4 up to, but not including, 0.6. The tonal filter kernel 200 outputs a value 0.0 for all other pixel values. In this example, the tonal filter kernel 200 integrates, or has an area of, 1.0.

Returning to method 100, step 115 shifts the domain of the tonal filter kernel function according an offset. In an embodiment, the shifted tonal filter kernel is identical to the original tonal filter kernel, but centered around a different pixel value. For example, tonal filter kernel 300 may be shifted to be centered around a pixel value of 0.1. In this example, the shifted tonal filter kernel outputs a value of 5.0 for any pixel value from 0.0 up to, but not including, 0.2 and a value 0.0 for all other pixel values.

Step 120 generates an offset-kernel image from the received image data and the shifted kernel image. Each pixel of an offset-kernel image is generated by mapping the corresponding pixel of the received image data according to the shifted kernel function.

Figure 3A:
FIGS. 3A-3D illustrate an example application of a method of computing local histograms and local histogram-based attributes according to an embodiment of the invention.

FIG. 3A illustrates an example 305 of the generation of an offset-kernel image from a received source image 310. In example 305, the kernel function 300 is shifted to be centered around a pixel value of 0.1, such that the shifted kernel function outputs a value of 5.0 for any pixel value from 0.0 up to, but not including, 0.2 and a value 0.0 for all other pixel values. Applying this shifted tonal filter kernel to each of the pixel values of the source image 310 results in the offset-kernel image 315.

Comparing the pixel values of the source image 310 with their corresponding values in offset-kernel image 315, source image pixels 312A and 312E, having values of 0.0 and 0.1 respectively, correspond with offset-kernel image pixels 317A and 312E, which are set to a value of 5 by the shifted tonal filter kernel. The remaining source image pixels 312B-212D and 312F-212I correspond with offset-kernel image pixels 317B-217D and 317F-217I set to a value of 0.0 by the shifted tonal filter kernel.

Returning to method 100, steps 115 and 120 may be repeated to generate one or more additional offset-kernel images, each based on the tonal filter kernel shifted by a different amount. Additionally, the unshifted tonal filter kernel may be used to generate one of the offset-kernel images. Embodiments of steps 115 and 120 may generate multiple offset-kernel images in parallel or in series.

As discussed in detail below, each offset-kernel image is used to generate a sample of the local histogram or local histogram-based function for one or more pixels in the source image. Because of this, embodiments of the invention may use any arbitrary number of shifted tonal filter kernels to generate corresponding offset-kernel images, allowing the local histogram or local histogram-based function to be sampled at any desired resolution. Further embodiments of the invention may generate sufficient numbers of offset-kernel images to sample the local histogram or local histogram-based function at or above the Nyquist sampling rate limit.

Embodiments of the invention may set the width of the tonal filter kernel, the number shifted tonal filter kernels evaluated, and the location of the shifted tonal filter kernels to sample all or a fraction of the possible values of pixels at any desired resolution. Additionally, shifted tonal filter kernels may partially overlap. In a further embodiment, the shape of the tonal filter kernel may vary at the boundaries of the domain. For example, changing the shape of the tonal filter kernel prevents the area of the tonal filter kernel from decreasing as a result of being clipped at the boundary of the domain, which would bias the resulting local histogram or local histogram-based function against pixel values near domain boundaries, such as pixel values near 0 or 1 in the above example. In another example, if the pixel value domain is circular, (e.g. representing an angle or hue in an HSV color space), then the shifted tonal filter kernel may wrap at the domain boundaries.

Figure 3B:
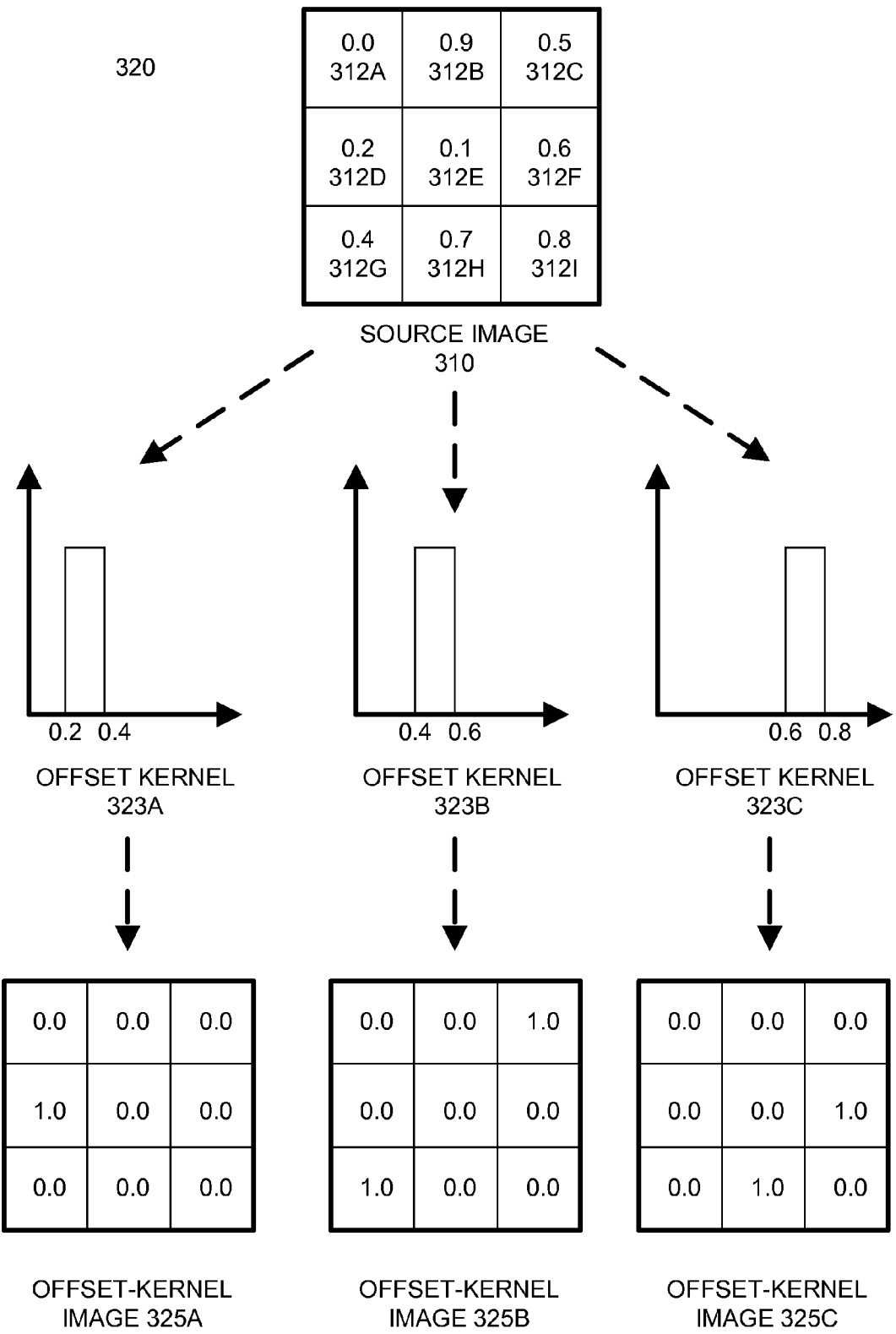

FIG. 3B illustrates an example 320 for determining multiple additional offset-kernel images according to an embodiment of the invention. In this example 320, a source image 310 is processed by a plurality of different shifted kernels 323, including shifted kernel 323A associated with the pixel values between 0.2 and 0.4, shifted kernel 323B associated with the pixel values between 0.4 and 0.6, and shifted kernel 323D associated with the pixel values between 0.6 and 0.8. The shifted kernels 323 generate corresponding offset-kernel images 325, including offset-kernel images 325A, 325B, and 325C, corresponding with shifted kernels 323A, 323B, and 323C.

Following step 120, method 100 determines the sampled local histogram or local histogram-based function for one or more source image pixels based on the set of offset-kernel images generated by steps 105 to 120. This set of offset-kernel images can be reused to determine the sampled local histogram or local histogram-based function for multiple source image pixels and/or for multiple neighborhoods of any arbitrary shape and size.

Step 125 selects a source image location for processing. The source image location may correspond with a single pixel in the source image or may be between two or more pixels. In the case of the latter, linear or non-linear interpolation may be used to determine one or more sub-pixel values in the source image and/or offset-kernel images for the selected source image location. Step 125 may select source image pixels based on instructions from a user or an application. In an embodiment, multiple iterations of step 125 are used to select and process all or a portion of the pixels of the source image.

Step 130 select a neighborhood filter size and neighborhood weights. Embodiments of step 130 can be used to generate sampled local histogram or local histogram-based function for any arbitrary size and shape neighborhood around the selected source pixel. The size and shape of the neighborhood filter can be used to control the aesthetics or other characteristics of the results. Embodiments of step 130 may select the neighborhood filter size and neighborhood weights based on instructions from a user or an application.

In an embodiment, a circular or radially symmetric neighborhood is selected by step 130 to avoid anisotropic visual artifacts. However, other embodiments of the invention may use asymmetrical neighborhoods for emphasis in a particular direction. Further embodiments of the neighborhood filter may alter frequency spectrum of pixel data. For example, the neighborhood filter may include a low-pass filter, a high-pass filter, a band-pass filter, or filters with other frequency domain characteristics.

Step 130 may define the filter neighborhood as a function with a set of weight values. Non-zero weight values in the function specify neighboring pixels within the filter neighborhood. Conversely, zero weight values in the function specify neighboring pixels outside the filter neighborhood. Additionally, an embodiment of the invention may have the influence of nearby pixels fall off gradually with distance. For this, an embodiment of step 130 sets the non-zero weight values in the function to be between one and zero, decreasing in value with distance from the center of the function. In a further embodiment, the function may be defined as an all positive weighting function with unit integral, such as a Gaussian function or distribution. Embodiments of method 100 may implement the filter neighborhood function discretely as a mask or analytically.

Step 135 determines the weighted sum of each offset-kernel image at the selected image location using the filter neighborhood. In an embodiment, step 135 selects one of the offset-kernel images. Step 135 then centers the filter neighborhood function at the image location of the offset-kernel image corresponding with the selected image location of the source image. Step 135 determines a weighted sum or a convolution of the neighborhood filter function with the selected offset-kernel image. The resulting value from this weighted sum represents a sample of the local histogram or histogram-based function.

Figure 3C:
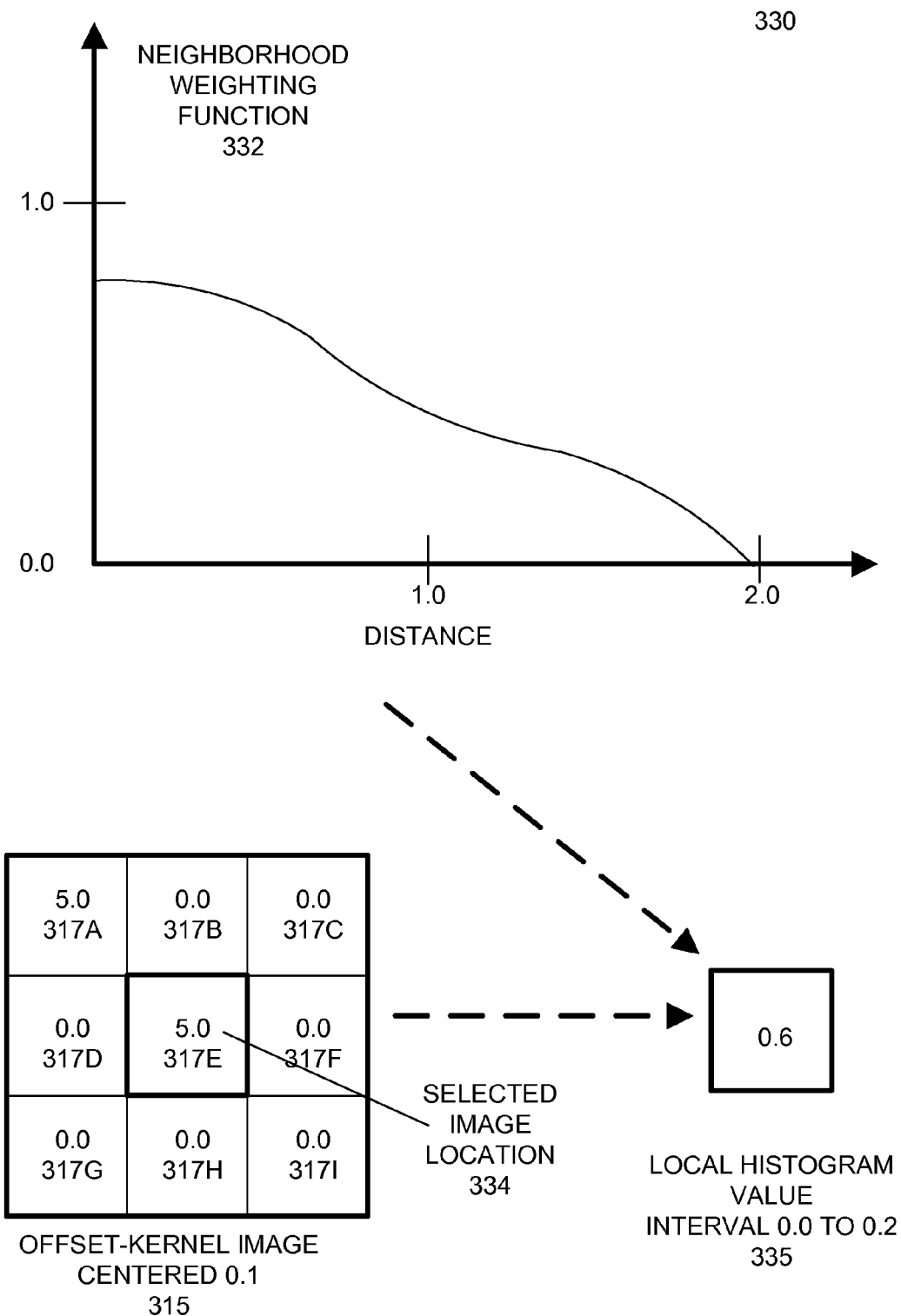

FIG. 3C illustrates an example 330 that determines one of the sampled values of the local histogram or histogram-based function for a selected source image pixel and a filter neighborhood. Example 330 includes a neighborhood weighting function 332 specifying weight values for neighboring offset-kernel image pixels based on their distance from the selected pixel in the offset-kernel image. For example neighborhood weighting function 332, the weight decreases as a function of distance from the selected pixel. Additionally, example neighborhood weighting function 332 is radially symmetric.

Applying the example neighborhood weighting function 332 to the neighborhood surrounding selected pixel 334 in the offset-kernel image 315, corresponding with the selected pixel in the source image, the weighted sum or convolution is equal to 0.7. This value is the local histogram sample value 335 for the interval of pixel input values between 0.0 and 0.2, which is the domain of the shifted tonal filter kernel used to generate offset-kernel image for the selected pixel.

Returning to method 100, embodiments of step 135 may repeat this evaluation for all or a portion of the other offset-kernel images, resulting in a set of samples of the local histogram or histogram-based function. Step 140 combines the values determined from the local neighborhoods of the offset-kernel images to determine a local histogram or local histogram-based function output. In an embodiment, each offset-kernel image can be evaluated with respect to the filter neighborhood for the selected pixel to determine one sample of the local histogram or histogram-based function. Each sample represents the value of the local histogram or histogram-based function at the pixel input value associated with the shifted kernel used to generate its offset-kernel image.

Figure 3D:
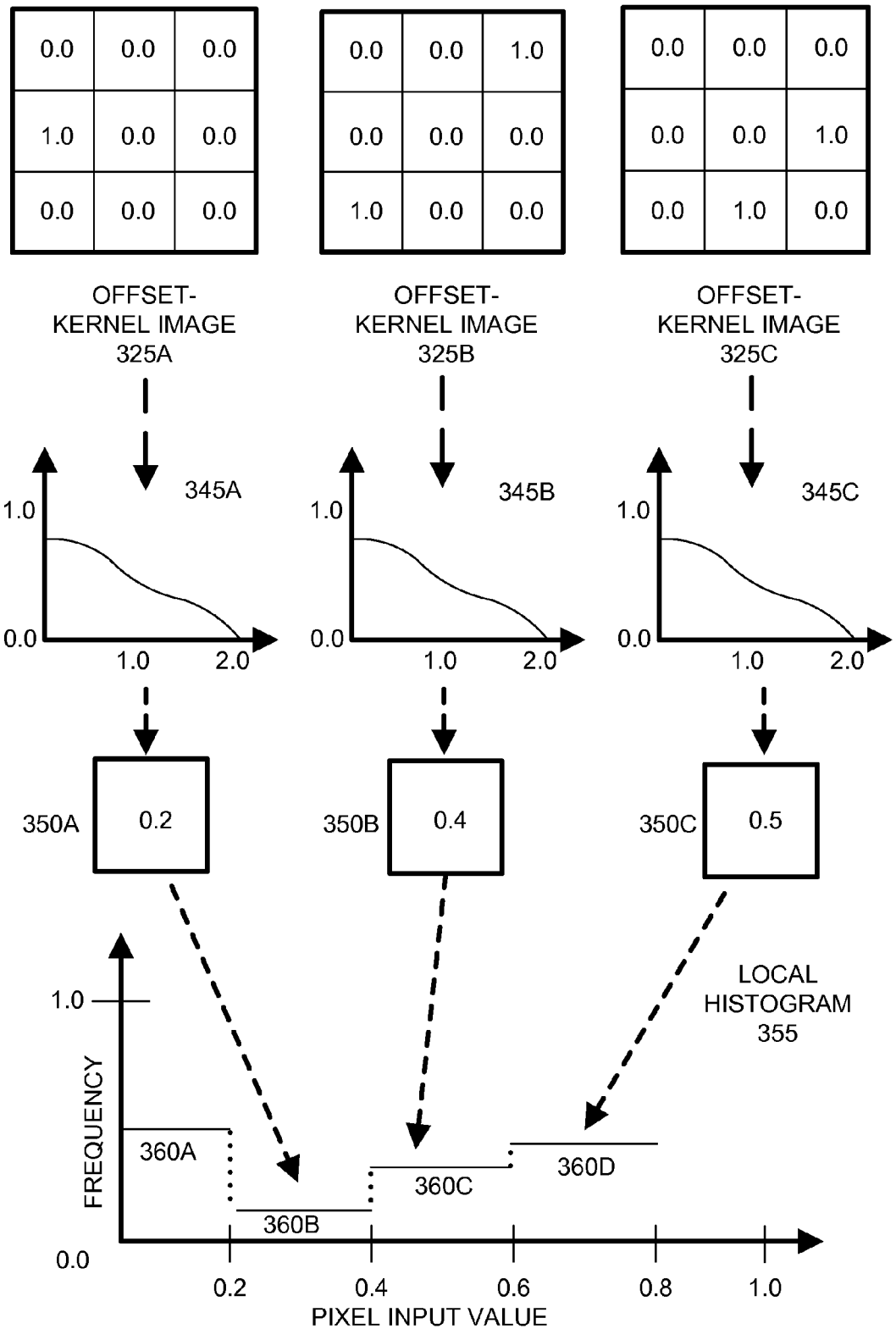

FIG. 3D illustrates an example 340 that determines additional sample values of the local histogram or local histogram-based function. Offset-kernel images 325A, 325B, and 325 are convolved with neighborhood weighting functions 345A, 345B, and 345C, respectively. Neighborhood weighting functions 345 may be identical or different for each offset-kernel image.

The results of each offset-kernel image's 325 convolution with its respective neighborhood weighting function 345 are samples 350 of the local histogram for the selected image pixel. The set of samples 350 can be used to determine a representation of the complete local histogram or histogram-based function, such as local histogram 355.

In example 340, sample 350A specifies the value 360B of the local histogram 355 over the interval between 0.2 and 0.4. Similarly, sample 350B specifies the value 360C of the local histogram 355 over the interval between 0.4 and 0.6, and sample 350C specifies the value 360D of the local histogram 355 over the interval between 0.6 and 0.8. Additionally, the local histogram value 335, shown in FIG. 3D, specifies the value 360A of the local histogram 355 over the interval between 0.0 and 0.2.

Embodiments of step 140 may output the entire local histogram or histogram-based function. Further embodiments of step 140 interpolate between the samples of the local histogram or histogram-based function to determine values between samples. Embodiments of step 140 may use interpolation and other techniques on the local histogram or histogram-based function to find pixel input values corresponding with peaks, valleys, or zero-crossings of the local histogram or histogram-based function.

Steps 125 to 140 may be repeated to determine local histogram or histogram-based function values for additional pixels of the source image and/or for additional neighborhood shapes and sizes. In a further embodiment, all or a portion of steps 125 to 140 may be executed in parallel for two or more pixels to determine their respective local histograms or histogram-based functions.

Closest-Mode Filter

As described above, embodiments of the invention may identify modes of the smoothed local histogram directly by sampling the image data using a smoothed tonal filter kernel, such as filter kernel 210, to determine the local histogram function or by sampling the image data using a derivative tonal filter kernel, such as filter kernel 220, to find zero crossings of the derivative of the local histogram. Identifying all the modes in the smoothed local histogram enables the identification of the mode closest to the intensity of each pixel. The closest mode is defined to be the local histogram mode one would reach by steepest ascent in the smoothed local histogram from the current pixel's intensity value. In an embodiment, the closest mode filter is interpolated among the functions $D_i$ to estimate $D(I_p)$, the derivative of the smoothed local histogram at the current pixel's intensity value $I_p$. If the derivative is positive, the filter outputs the nearest local histogram mode greater than the pixel value. Otherwise, the filter outputs the nearest local histogram mode less than the current pixel's intensity value.

For example, if a pixel has a value of 0.4 and the local histogram function for this pixel and its neighborhood includes local histogram modes corresponding with pixel values of 0.5 and 0.1, the closest mode filter will output 0.5 as the closest mode for this pixel value.

Because this filter computes the image without iteration and without any use of the mean-shift vector, it is called the "closest-mode filter." To compute the closest mode filter, in an embodiment, the original image is first transformed into HSV space, then closest-mode filtered in the V channel and finally transformed back to RGB. The choice of HSV space for the filtering is to avoid slight misalignments that can arise in the positioning of edges in the different color channels. An embodiment of the invention uses a Gaussian for W and compute the convolution hierarchically, so the amount of processing required is independent of the size of the histogram neighborhood.

Where the input image crosses a mode boundary, the output of the closest mode filter is discontinuous. When computed with a single sample per pixel, this can result in significant aliasing. To attenuate aliasing artifacts, an image may be antialiased with oversampling. An embodiment of the invention computes the functions $D_i$ only once per pixel, but supersample the original image with bi-linear interpolation. The closest modes for each of the image super-samples are averaged together to yield the value of the output pixel. Because most of the computation time is in doing the convolutions to evaluate the functions $D_i$, oversampling for antialiasing has a small impact on the total running time.

Median Filter

The closest-mode filter is an edge preserving filter, which reduces noise image without blurring sharp edges. Another edge preserving filter is a local median filter. In an embodiment, the technique used for determining the derivative function of a local histogram applies equally well to integrals or further derivatives of the smoothed local histogram ($\hat{f}_p$). For example, let E be the indefinite integral of a tonal filter kernel K. If K is a Gaussian, then E will be a corresponding erf function. An embodiment of the invention estimates the integrals of $\hat{f}_p(s)$ as $R(p)=\int \hat{f}_p(s)ds=E(s-I_p) \otimes W$ using the functions $R_i(p)=E(I_p-s_i) \otimes W$, where W is the neighborhood weighting and E is an integral of the histogram tonal filter kernel, such as the integral of tonal filter kernel 210.

An embodiment of the invention determines the median filter using method 100 and the integral of a tonal filter kernel, such as the integral of tonal filter kernel 210, to determine a sampled integral function of the local histogram. This embodiment of the invention then uses interpolation to find a pixel intensity value corresponding with a sampled integral function value of 0.5 (which is by definition the median).

Morphology

Further embodiments of the invention may determine input values for other sampled integral function values to determine arbitrary quantiles of image values in a local neighborhood. For example, an embodiment of the invention may use method 100 and an integral of a tonal filter kernel to determine a pixel intensity value of the sampled integral function corresponding with a sampled integral function value of 0.1. This input value of the sampled integral function represents the 10th percentile (or 1st decile, 100th permillage, etc.) of image values in the local neighborhood. Thus, 10% of the image values in the local neighborhood have locally-weighted values less than or equal to the identified pixel intensity value of the sampled integral function. Similarly, determining the input value corresponding with a sampled integral function value of 0.9 defines the 90th percentile of locally-weighted image values.

Morphological operators are a class of popular image filters used for a wide range of image-processing applications. The fundamental morphological operators are dilation, defined as the maximum intensity within a region and erosion defined as the minimum intensity within a region. Embodiments of the invention can implement dilation and erosion in a manner similar to that of the median filter.

Dilation, erosion, and median filters can be computed as described for the median filter by selecting different target percentiles. When the percentile is 0% or 100%, the filter performs a dilation or erosion operation, respectively. For any percentile in-between, however, the neighborhood weighting has an impact on filter output. If the traditional erode and dilate operators are modified to identify pixel intensity values corresponding with the 5% and 95% quantiles of the sampled integral function, the result is very similar to the traditional dilation and erosion operators, but with added robustness against noise.

Dominant-Mode Filter

In addition to the local median filter, embodiments of the invention may be used to evaluate a dominant mode filter. The dominant mode filter can be used as an alternative to the local median filter. For example, in some applications, the concept of a median is undefined. For example, angles exist on a circular domain that wraps or repeats every 360 degrees. Because there is no "beginning" or "end" to this domain, the median is undefined in this context.

There are a variety of problems of interest in computer graphics, computer vision and digital photography where the quantity to be filtered is an angle. One example is hue in HSV space. For painterly stylization, it is useful to process angles that describes the orientations of a brush stroke.

In an embodiment, the dominant mode filter is determined using method 100 and a derivative of a tonal filter kernel, such as tonal filter kernel 220. Using the resulting sampled derivative function of the local histogram, an embodiment of the invention uses interpolation to find the input values corresponding with the local histogram modes (i.e. negative-going zero crossings) and local histogram anti-modes (i.e. positive-going zero crossings).

An embodiment of the dominant mode filter determines the area of the local histogram function under each identified local histogram mode. In an embodiment, the dominant mode filter uses method 100 and an integral of a tonal filter kernel, such as an integral of a tonal filter kernel 210, to determine a sampled integral function of the local histogram. For each identified local histogram mode, an embodiment subtracts the value of the sampled integral function of the local histogram at its right-most adjacent anti-mode from the value of the sampled integral function of the local histogram at its left-most adjacent anti-mode. This gives the value of integral function underneath the local histogram mode. The local histogram mode with the largest integral value is the dominant mode. The magnitude and/or the input value corresponding with the dominant mode is then output by the dominant mode filter.

Embodiments of the dominant mode filter can be applied to circular and non-circular domains. However, for circular domains, an embodiment of the dominant mode filter computes the integrals taking into account branch cuts, such as the transition of an angular domain from 359 degrees to 0 degrees. For integrals that span the branch cut, an embodiment of the dominant mode filter determines the integral in two pieces, one on each side of the branch cut.

Like the local median filter, the dominant mode filter removes the noise very effectively. A close examination will also reveal that it produces a sharper output on some edges than the median. This is a common feature of mode filters. At mode boundaries, the dominant mode filter will switch discontinuously from one mode to another, creating an absolutely sharp edge where a somewhat blurred edge may have existed previously. For a smoother result, embodiments of the local median filter, closest-mode filter, dominant mode filter, and any other mode-based filter can be blended together when two modes account for nearly equal fractions of the population (i.e. when two modes have nearly equal magnitudes).

Sampling Rates and Performance

The amount of smoothing of the histogram and the amount of error that can be tolerated determine the number of lookup tables (i.e. the number of shifted tonal filter kernels and kernel-offset images) required for all of to implement the filters. FIG. 3 shows the relationship for the case where the tonal filter kernel K is a Gaussian of standard deviation $\sigma$ and the error criterion is the root-mean-square difference between the ideal filter and the effective filter resulting from linear interpolation. For example, if 5% root-mean-square interpolation error is tolerable, the centers of the lookup tables $D_i$ should be no farther apart than $0.54\sigma$. The error can be reduced to 1% if the centers are no farther apart than $0.24\sigma$. If samples using lookup-tables with the shifted smoothing tonal filter kernel 210 K are used to estimate the histogram value, these can be computed at a lower sampling rate, as shown in the figure.

The median and morphology computations require only the look-up tables $R_i$, which are lower-pass than K, so they can be computed at even lower sampling rates for the same accuracy. The mean-square error in this case depends on the integration interval, so it is difficult to summarize in a single figure of merit. Typically, even 10 samples of $S_i$ provide a good-quality median filter of 8-bit images with a separation of $\sigma$.

The running time of all the filters described above are $O(1/\sigma)$ and independent of the neighborhood sizes. The great majority of the work is in the spatial filtering, so the best estimate of the running time on any given hardware is the rate at which it can do hierarchical or recursive Gaussian convolutions.

Separating Base from Texture

In a variety of computational photography applications, images are decomposed into a piecewise-smooth base layer and one or more detail layers. The idea is to capture the large-scale variations of image intensity in the base layer while putting fine-scale image texture into the detail layers. Depending on the application, the base layer and the detail can then be processed in different ways and recombined.

In prior implementations, the base layer is typically created with an edge-preserving smoothing filter such as the bilateral filter, anisotropic diffusion, or a least-squares procedure. The detail layer or layers then characterize what is left after the base layer is removed, either by subtraction or sometimes division. In applications like HDR tone mapping, the detail may be boosted, while in image stylization, the detail may be attenuated.

A key problem with all of these prior methods is preventing high-contrast large-scale edges from "leaking" into the detail layers, which can cause halos or other artifacts in further processing.

The closest-mode filter (and hence the mean-shift) is very good at tracking the center of the underlying distributions of image textures. Peaks in the local histogram are strong and robust indicators of the centers of the distributions, and they rarely blur high-contrast features. These features should make the filter very attractive. However, from the point of view of separating a base layer from a detail layer, local histogram modes have a severe weakness that has up to now prevented their use. The weakness is that they radically over-sharpen edges.

In a variety of computational photography and image processing applications, images are decomposed into a piecewise-smooth base layer and one or more detail layers. This is done to capture the large scale variations of image intensity in the base layer while putting fine-scale image texture into the detail layers. Depending on the application, the base layer and the detail can then be processed in different ways and recombined. The detail layer or layers then characterize what is left after the base layer is removed, either by subtraction or sometimes division. In applications like HDR tone mapping, the detail may be boosted, while in image stylization, the detail may be attenuated.

A key problem with all of these methods is preventing high-contrast large-scale edges from "leaking" into the detail layers, which can cause halos or other artifacts in further processing.

From a statistical point of view, the base layer should contain variations of the mode over the image and the transitions from mode to mode. The detail image should be limited to variation within a single mode. Embodiments of the invention can be applied to make this distinction.

For example, if a pixel has a value between two local histogram modes of nearly equal magnitude, it is very likely that the pixel is a transitional value on the edge between the two modes. In an embodiment, a function C is defined as the ratio of the populations of the most frequent mode to the second most frequent mode. If there is only one mode, C will be infinite. An embodiment of the invention defines a Halo removal function as $C-1$, which may be scaled and clipped. A detail image may be multiplied by the halo removal function to avoid halo artifacts.

Selective Diffusion

Local image histograms, such as those determined using the above-described filters, alone say nothing at all about the spatial layout of their data samples. They contain no indication of a gradual spatial shift from one mode to another. Thus, in order to track a blurred edge accurately, more information must be extracted from the original images. An embodiment of the invention extracts spatial layout information by supplementing edge-preserving local histogram-based filters with a diffusion step. As described in detail below, embodiments of edge preserving diffusion filters blur the output of an edge preserving local histogram filter, such as the closest mode filter, median filter, or dominant mode filter, and compare the pixels of the blurred image with those of the unfiltered image. If the blurred edge-preserving filter causes a pixel value to get closer to the unfiltered image, the blurred version is preferable as a base layer.

More specifically, let S be the output of an edge-preserving smoothing filter, such as the closest mode filter, median filter, or dominant mode filter as described above. An embodiment of the invention constructs a modified output image D which is blurred from S anywhere that blurring causes it to agree more closely with the original input image I. In an embodiment, this is performed iteratively, for example considering a variety of different Gaussian blurring kernels G(σ$_i$) in turn. For example, let D$_0$=S be the original output of the filter. An embodiment of the edge-preserving diffusion filter constructs D$_i$ from D$_{i-1}$ by selectively blending between D$_{i-1}$ and a blurred version B=D$_{i-1}$*G(σ$_i$).

An important observation is that this filter only updates a pixel with a blurred version if a region around that pixel of size σ$_i$ is consistently improved by the blurring. Accordingly an embodiment of the edge-preserving diffusion filter constructs error metrics to measure the local L$^2$ deviation of the unblurred (E$_u$) and blurred (E$_b$) versions from the original image:

$$E_u(p)=(D_i-I)^2*G(\sigma_i)$$

$$E_b(p)=(B_i-I)^2*G(\sigma_i) \quad (9)$$

Let R(p)=E$_u$(p)/E$_b$(p) be the ratio of the error of the blurred version to the unblurred version. Where R is larger then one, the filter prefers the unblurred version. Where R is smaller, the filter blends towards the blurred one. Many different types of blending may be used. For example:

$$D_i = \begin{cases} B_i & R < .5 \\ 2\left(R - \frac{1}{2}\right)(D_{i-1} - B_i) + B_i & R \in [.5, 1) \\ D_{i-1} & R \geq 1 \end{cases} \quad (10)$$

Figure 5:
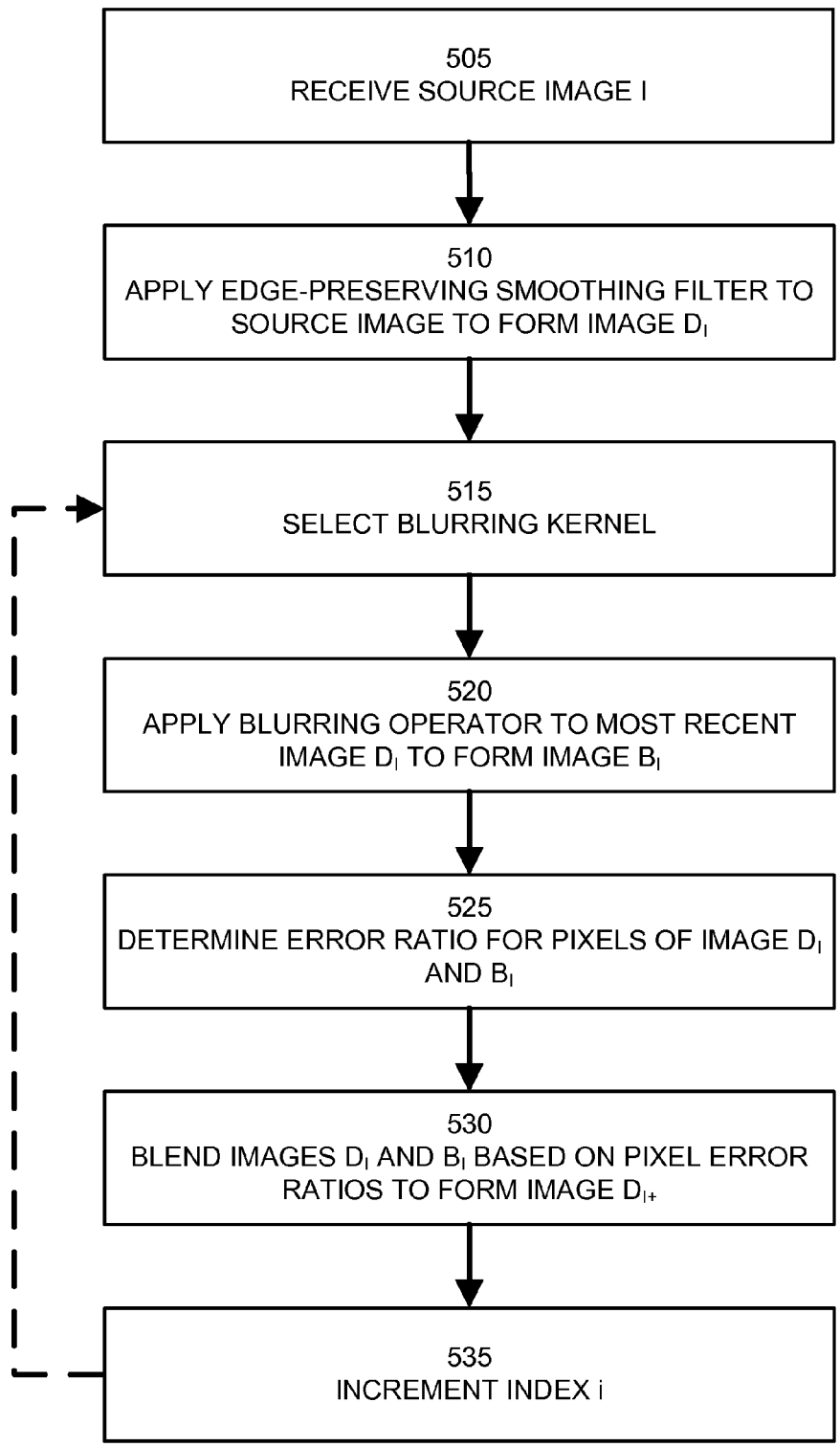
FIG. 5 illustrates a method of applying an edge-preserving diffusion filter according to an embodiment of the invention.

FIG. 5 illustrates a method 500 of applying an edge-preserving diffusion filter according to an embodiment of the invention. Step 505 receives a source image. Step 510 applies an edge-preserving smoothing filter to the source image to form an initial version of image D$_i$, where i is the iteration number of method 500. The edge-preserving smoothing filter may be any type of filter, including the local histogram-based filters evaluated as described above or other filters that may or may not be based on local histograms or local histogram attributes, such as a bilateral filter.

Step 515 selects a blurring operator. In general, a blurring operator is any image processing function or operator that, on average, reduces the magnitude of high spatial frequency components of an image relative to the magnitude of low spatial frequency components of the image. Blurring operators may be non-linear or linear operators and may, for example, by expressed as a linear or non-linear filter kernels. As described above, examples of the blurring operator may be a Gaussian blurring kernel with a standard deviation based on the desired blurring neighborhood size. The blurring neighborhood size may vary between iterations of method 500.

Step 520 applies the blurring operator to the most recent version of image D$_i$ to form a blended image B$_i$. Step 525 determines error ratios for each of the pixels of the image D$_i$ and B$_i$ by comparing the pixels of these images with the corresponding pixels in original source image I using equation 9 described above and determining the ratio R between these two error metrics as follows: R(p)=E$_u$(p)/E$_b$(p).

Step 530 blends images D$_i$ and B$_i$ together based on the error ratio value R for each pixel. In an embodiment, step 530 blends each pixel as described in equation 10 above. In this embodiment, the value of a pixel in an output image D$_{i+1}$ is equal to the corresponding pixel in the edge-preserving filtered image D$_i$ if the error ratio for this pixel is greater than or equal to 1. The value of a pixel in an output image D$_{i+1}$ is equal to the corresponding pixel in the blended filtered image B$_i$ if the error ratio for this pixel is less than 0.5. If the error ratio of a pixel is between 0.5 and 1.0, then the value of the pixel in the output image D$_{i+1}$ is equal to a weighted combination of the corresponding pixels in the blended filtered image B$_i$ and D$_i$.

The result of step 530 is a edge-preserving diffusion filtered version of the image D$_{i+1}$. Steps 515 through 535 may be optionally repeated for multiple iterations of this blending and filtering. To do so, step 535 increments the index value i, such that the edge-preserving diffusion filtered version of the image D$_{i+1}$ becomes the new base image D$_i$ to be blurred and blended.

Figure 6:
FIG. 6 illustrates an example output of an edge-preserving diffusion filter according to an embodiment of the invention.
Figure 6:
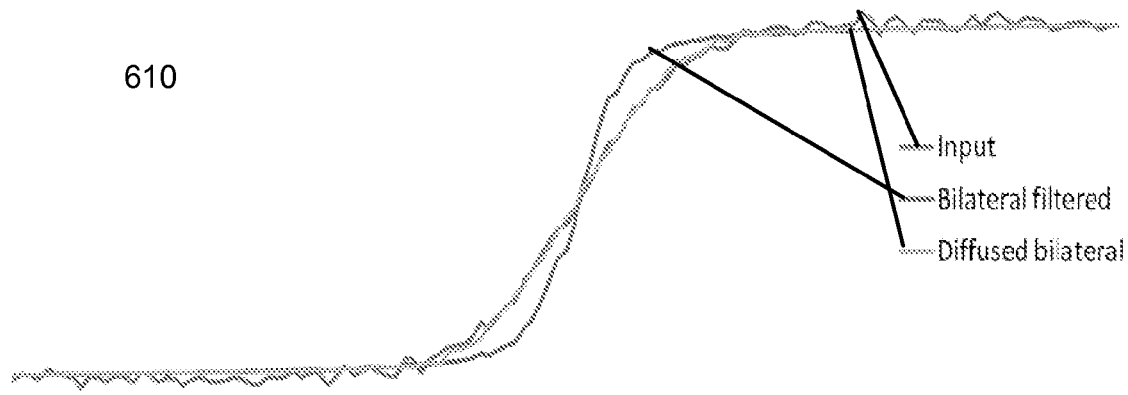

FIG. 6 shows the result 600 for a synthetic blurred step edge with added noise. The closest-mode filter turns the soft edges into a very sharp transition, as shown in graph 605. After diffusion, however, it accurately tracks the input edge while smoothing out the high-frequency noise. The bilateral filter, shown in graph 610, also sharpens the edge, but not nearly to the same degree. Here again, the diffusion method fixes the over-sharpening.

Figure 4:
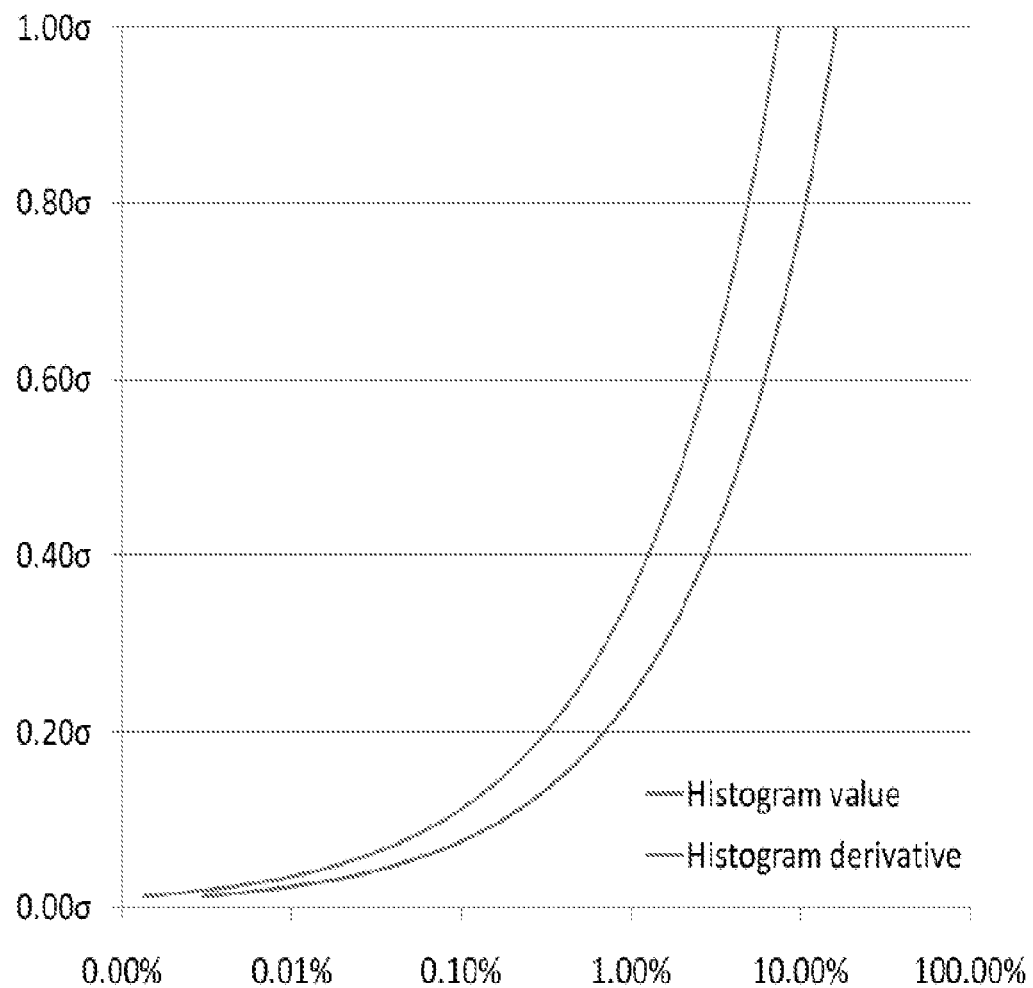
FIG. 4 illustrates example error tolerances for the method of computing local histograms according to an embodiment of the invention.
Figure 7A:
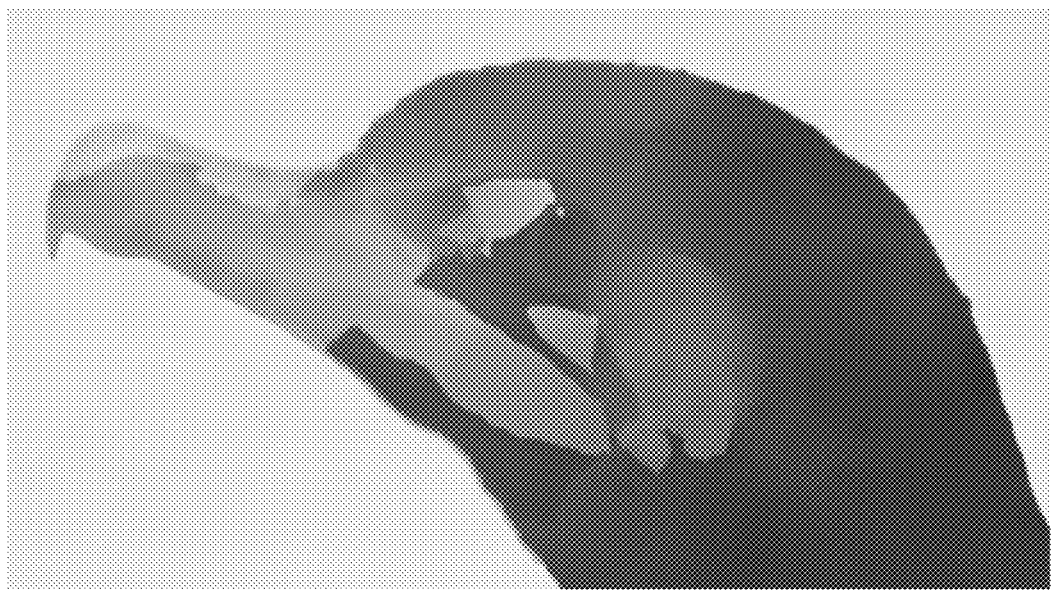
FIGS. 7A-7D illustrate example outputs of an edge-preserving diffusion filter according to an embodiment of the invention.
Figure 7B:
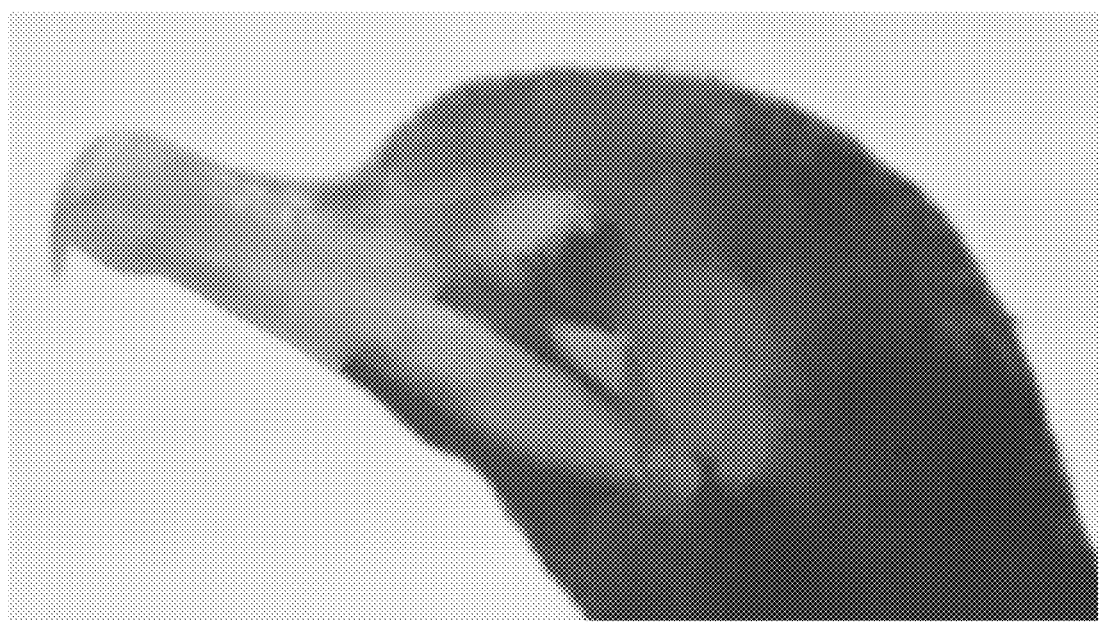
Figure 7C:
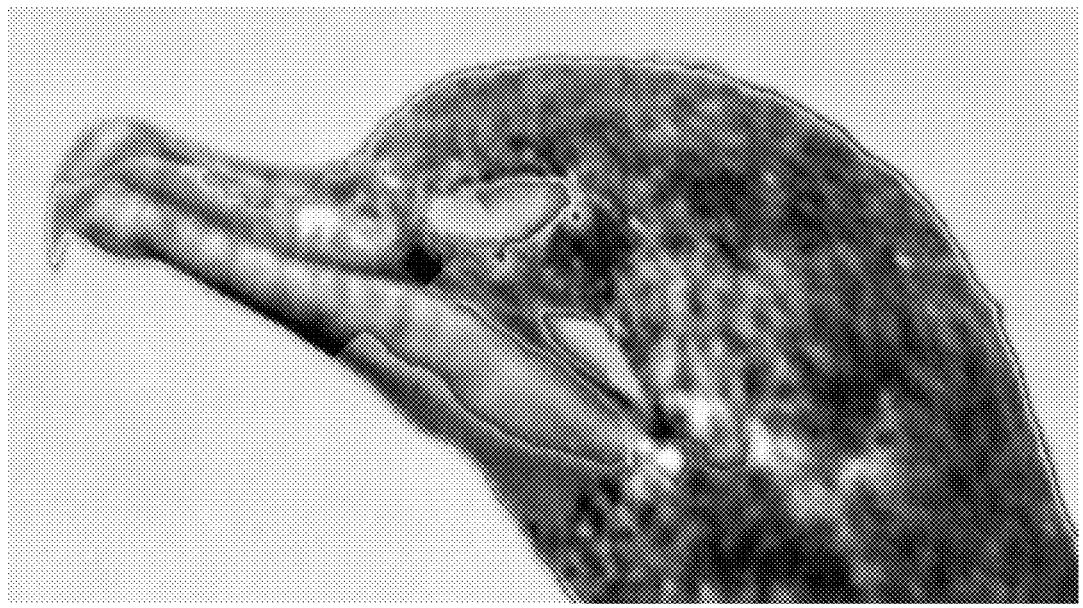
Figure 7D:
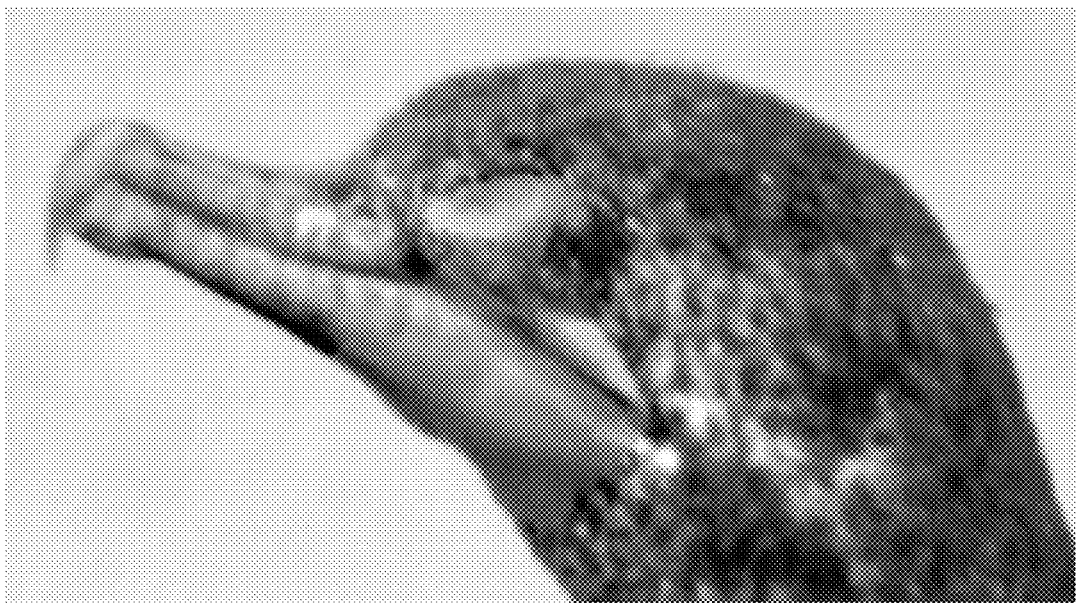

FIG. 7A-7D illustrates the diffusion process for a close crop of a Cormorant photo. FIG. 7A shows the result of closest-mode filtering the original. The edges are very sharp, as is typical for the closest-mode filter. In FIG. 7B the output of the closest-mode filter has gone through diffusion, greatly softening the edges. FIG. 7C shows what happens if the closest-mode filter is used as a base image for contrast enhancement. The difference between the original and the base has been multiplied by 3.5 and added to the base. The result shows ugly gradient reversal artifacts around the sharp edges. When a diffused version of the closest-mode filter is used as the base image, as shown in FIG. 4D, however, the artifacts go away.

Figure 8A:
FIGS. 8A-8b illustrate example outputs of an edge-preserving diffusion filter according to an embodiment of the invention.
Figure 8B:

In FIGS. 8A-8B, selective diffusion of edges is applied to an image filtered using a bilateral filter. FIG. 8A shows an image resulting from the application of a bilateral filter. Note the back of the Cormorant's head, where gradient reversal artifacts are evident in the form of a double line along the edge. After selective diffusion of edges, as shown in FIG. 8B, the artifacts from FIG. 8A are gone. With diffusion, the results are very similar to FIG. 8D, although not quite as sharp.

Multi-Layer Image Decomposition

When the above edge-preserving diffusion filter is used with the closest-mode filter for a base layer, the signal remaining in the detail layer retains a great deal of structure. This can be exploited to perform a recursive decomposition of an image into multiple layers of detail. Let B$_0$ be the base image created by closest-mode filtering an original image I followed by selective diffusion, as described above. Then D$_1$=I−B$_1$ is the first-level detail image. This embodiment then applies same type of decomposition to D$_1$ forming a new base image B$_2$ and a detail layer D$_2$. After N steps, the result is a decomposition of the image into a set of layers plus a residual.

$$I = \left(\sum_{i=1}^{n} B_i\right) + D_n$$

Figure 9:
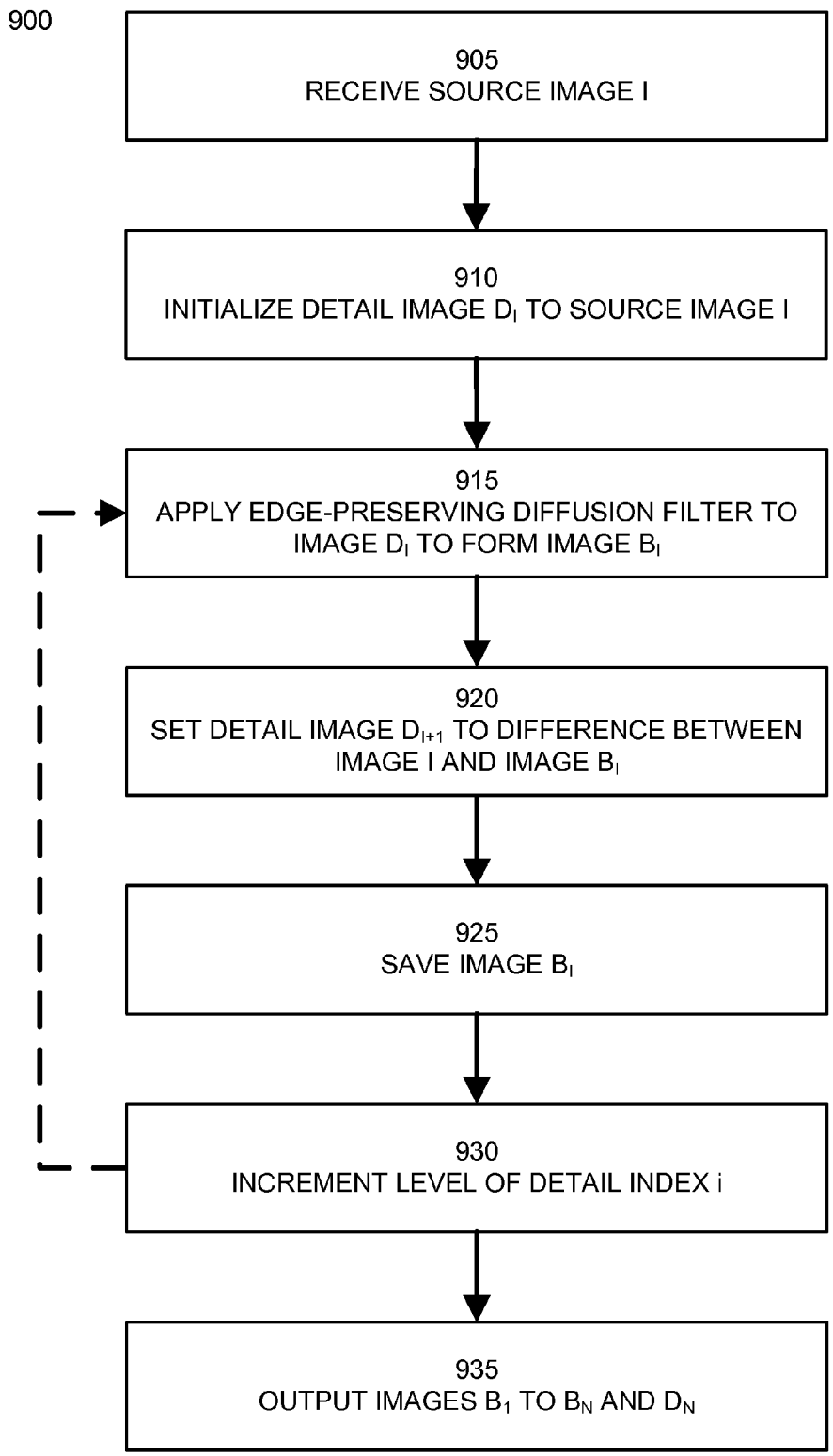
FIG. 9 illustrates a method of applying a multi-layer edge-preserving diffusion filter according to an embodiment of the invention.

FIG. 9 illustrates a method 900 of applying a multi-layer edge-preserving diffusion filter according to an embodiment of the invention. Step 905 receives a source image I. Step 910 initializes a first detail image D$_i$ to the received source image I and the current level of detail, i, is set to 1.

Step 915 applies an edge-preserving diffusion filter to the current detail image D$_i$. In an embodiment, step 915 uses the edge-preserving diffusion filter described above to form a base image $B_i$ at the current level of detail i. In an embodiment, each iteration of step 915 uses an edge-preserving diffusion filter with a different filter kernel. In a further embodiment, the magnitude of the filter kernel is changed during each iteration so that each of the resulting base and detail images have features of different contrast level.

Step 920 sets a detail image for the next level of detail, $D_{i+1}$, to the difference between the source image I and $B_i$, the detail image at the current level of detail.

Step 925 saves the base image $B_i$ for the current level of detail i.

Method 900 may be repeated for any number of iterations N, where N is any arbitrary positive integer. If the current level of detail i is less than N, optional step 930 increments i by 1 and method 900 repeats steps 915 to 930 one or more times. Following N iterations of steps 915 to 925, step 935 outputs all of the saved base image $B_1$ to $B_N$ and the current detail image $D_N$.

Instead of changing the spatial neighborhood size as the filter is applied to the layers of this decomposition, a further embodiment of the invention changes the histogram smoothing kernel K, reducing it at each iteration. This way, the decomposition is in terms of levels of contrast. The highest contrast features appear at the first level, and lower-contrast features appear at succeeding levels. Embodiments of the invention may output separate images for each level of detail or output an image that is a weighted combination of two or more of the level of detail images. This separation into base and detail can be repeated for different contrast levels, giving a very useful but different sort of multi-level decomposition than ordinarily used for digital photography or other image processing purposes.

Figure 10:
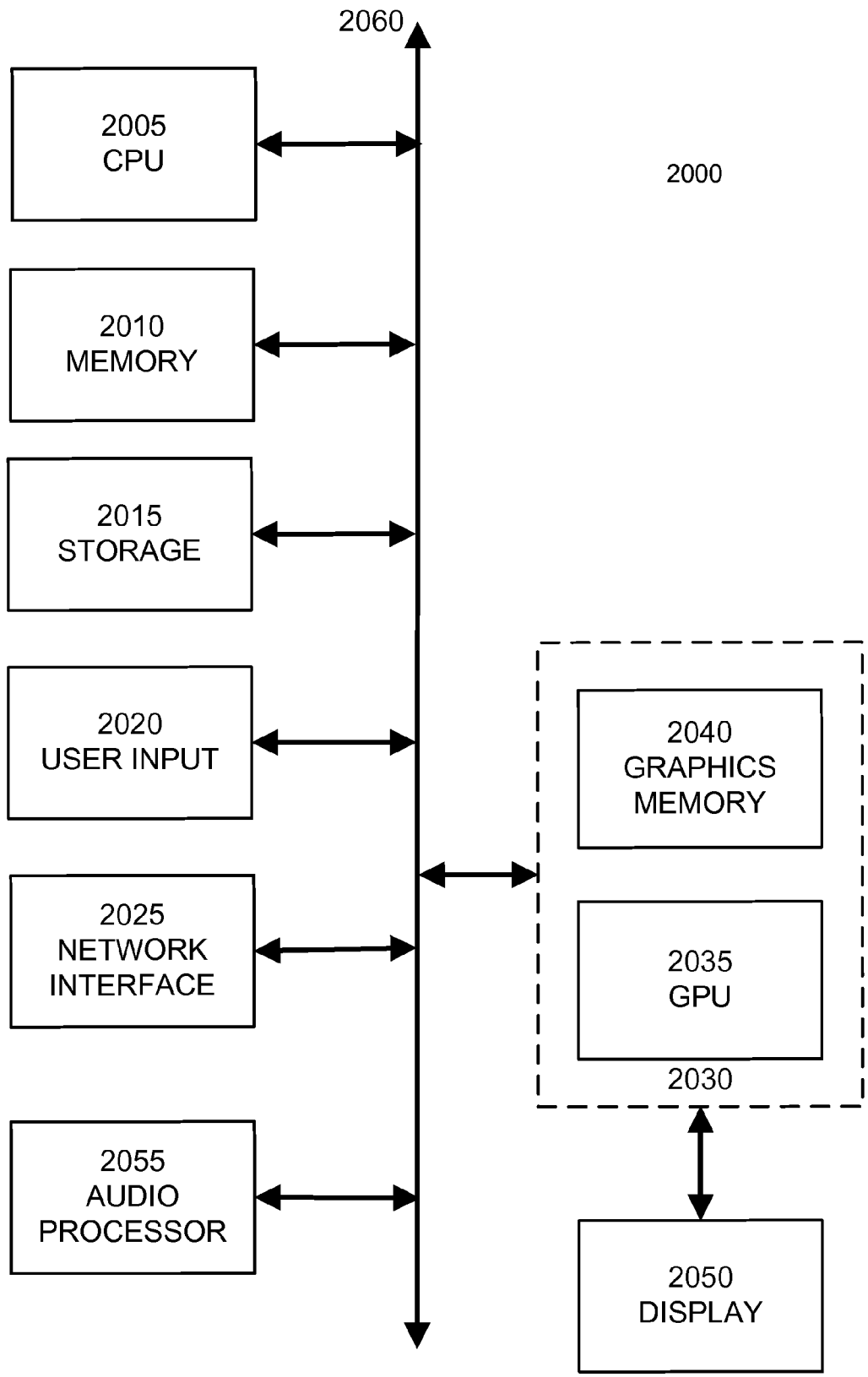
FIG. 10 illustrates a computer system suitable for implementing an embodiment of the invention.

FIG. 10 illustrates a computer system suitable for implementing an embodiment of the invention. FIG. 10 is a block diagram of a computer system 3000, such as a personal computer, video game console, personal digital assistant, or other digital device, suitable for practicing an embodiment of the invention. Computer system 3000 includes a central processing unit (CPU) 3005 for running software applications and optionally an operating system. CPU 3005 may be comprised of one or more processing cores. Memory 3010 stores applications and data for use by the CPU 3005. Storage 3015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 3020 communicate user inputs from one or more users to the computer system 3000, examples of which may include keyboards, mice, joysticks, digitizer tablets, touch pads, single or multitouch touch screens, still or video cameras, and/or microphones. Network interface 3025 allows computer system 3000 to communicate with other computer systems via an electronic communications network, and may include wired or wireless communication over local area networks and wide area networks such as the Internet. An audio processor 3055 is adapted to generate analog or digital audio output from instructions and/or data provided by the CPU 3005, memory 3010, and/or storage 3015. The components of computer system 3000, including CPU 3005, memory 3010, data storage 3015, user input devices 3020, network interface 3025, and audio processor 3055 are connected via one or more data buses 3060.

A graphics subsystem 3030 is further connected with data bus 3060 and the components of the computer system 3000. The graphics subsystem 3030 includes at least one graphics processing unit (GPU) 3035 and graphics memory 3040. Graphics memory 3040 includes a display memory (e.g., a frame buffer) used for storing pixel data for each pixel of an output image. Graphics memory 3040 can be integrated in the same device as GPU 3035, connected as a separate device with GPU 3035, and/or implemented within memory 3010.

Pixel data can be provided to graphics memory 3040 directly from the CPU 3005. In some implementations, instructions and/or data representing a scene are provided to renderfarm or set of server computers, each similar to computer system 3000, via the network interface 3025 or storage 3015. The renderfarm generates one or more rendered images of the scene using the provided instructions and/or data. These rendered images are returned to the computer system 3000 for display.

Alternatively, CPU 3005 provides the GPU 3035 with data and/or instructions defining the desired output images, from which the GPU 3035 generates the pixel data of one or more output images. The data and/or instructions defining the desired output images can be stored in memory 3010 and/or graphics memory 3040. In an embodiment, the GPU 3035 includes 3D rendering capabilities for generating pixel data for output images from instructions and data defining the geometry, lighting, shading, texturing, motion, and/or camera parameters for a scene. The GPU 3035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 3035 can further include one or more programmable execution units capable of executing shader programs. GPU 3035 can be comprised of one or more graphics processing unit cores.

The graphics subsystem 3030 periodically outputs pixel data for an image from graphics memory 3040 to be displayed on display device 3050. Display device 3050 is any device capable of displaying visual information in response to a signal from the computer system 3000, including CRT, LCD, plasma, OLED, and SED displays. Computer system 3000 can provide the display device 3050 with an analog or digital signal.

In embodiments of the invention, CPU 3005 is one or more general-purpose microprocessors having one or more homogenous or heterogeneous processing cores. In further embodiments, all or a portion of the graphics subsystem 3030 or GPU 3035 is integrated into CPU 3005.

In an further embodiment, the graphics subsystem 3030 and GPU 3035 may be adapted to perform non-graphics computations, operating as a programmable vector or stream data processing. Parallel programming architectures such as CUDA allow programmers to utilize the GPU 3035 to execute general-purpose algorithms via computational interfaces such as OpenCL and DX11 Compute.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of analyzing an image, the method comprising:
receiving, at one or more computer systems, at least one unfiltered image and at least one corresponding filtered image;
receiving, at the one or more computer systems, information indicative of a selection of a first image element of the filtered image;
receiving, at the one or more computer systems, information indicative of a first blurring operator;
applying, with one or more processors associated with the one or more computer systems, the first blurring operator to a neighborhood surrounding the first image element to determine a blurred image element, wherein the blurring operator is adapted to reduce a magnitude of a high spatial frequency component of an image spectrum relative to a magnitude of a low spatial frequency component of the image spectrum;
evaluating, with the one or more processors associated with the one or more computer systems, an error metric to compare the blurred image element and the first image element with a corresponding image element of the unfiltered image;
generating, with the one or more processors associated with the one or more computer systems, an output image including at least a first output image element; and
in response to the error metric satisfying a first criteria, setting, with the one or more processors associated with the one or more computer systems, the first output image element to equal the blurred image element.

2. The method of claim 1, wherein the error metric is adapted to quantify deviations of image elements from corresponding image elements in the unfiltered image.

3. The method of claim 1, wherein:
in response to the error metric satisfying a second criteria, setting, with the one or more processors associated with the one or more computer systems, the output image element to equal the first image element.

4. The method of claim 1, wherein:
in response to the error metric satisfying a second criteria, blending, with the one or more processors associated with the one or more computer systems, the first image element with the blurred image element to form a blended image element and setting the first output image element equal to the blended image element.

5. The method of claim 1, wherein the blurring operator is a linear filter kernel.

6. The method of claim 1, wherein the first blurring operator is selected from a plurality of blurring operators.

7. The method of claim 6, wherein the plurality of blurring operators including a Gaussian blurring operator.

8. The method of claim 1, further comprising:
receiving, at the one or more computer systems, information indicative of a selection of a second blurring operator;
applying, with the one or more processors associated with the one or more computer systems, the second blurring operator to a second neighborhood surrounding the first output image element in the output image to determine a second blurred image element;
evaluating, with the one or more processors associated with the one or more computer systems, a second error metric to compare the second blurred image element and the first image element with the first output image element in the output image;
generating, with the one or more processors associated with the one or more computer systems, a second output image including at least a second output image element; and
in response to the error metric satisfying the first criteria, setting, with the one or more processors associated with the one or more computer systems, the second output image element to equal the second blurred image element.

9. The method of claim 1, wherein the first and second blurring operators have different neighborhood sizes.

10. The method of claim 1, wherein the filtered image is the result of the application of a local histogram-based filter.

11. The method of claim 1, wherein the filtered image is the result of the application of a bilateral filter.

12. The method of claim 1, wherein the error metric is based on a ratio of differences between each of the blurred image element and the first image element with respect to the corresponding image element.

13. The method of claim 1, wherein the unfiltered image is included in a video sequence.

14. A method of analyzing an image, the method comprising:
receiving, at one or more computer systems, at least one unfiltered image;
applying, with one or more processors associated with the one or more computer systems, a first edge-preserving diffusion filter to the unfiltered image to form a first base image;
generating, with the one or more processors associated with the one or more computer systems, a first detail image based on differences between the unfiltered image and the first base image; and
storing the first base image and at least one detail image in a storage device associated with the one or more computer systems.

15. The method of claim 14, the method comprising:
applying, with the one or more processors associated with the one or more computer systems, a second edge-preserving diffusion filter to the first detail image to form a second base image; and
generating, with the one or more processors associated with the one or more computer systems, a second detail image based on differences between the unfiltered image and the second base image.

16. The method of claim 15, wherein the at least one detail image includes the second detail image.

17. The method of claim 15, wherein the first edge-preserving diffusion filter is applied with a first filter kernel associated with a first contrast level and the second edge-preserving diffusion filter is applied with a second filter kernel associated with a second contrast level.

18. The method of claim 17, wherein the first and second filter kernels are associated with a first neighborhood size.

19. The method of claim 17, wherein the at least one of the first and second filter kernels is a Gaussian filter kernel.

20. The method of claim 15, wherein at least one of the first and second edge-preserving diffusion filters includes an application of a local histogram-based filter.

21. The method of claim 15, wherein at least one of the first and second edge-preserving diffusion filters includes an application of a bilateral filter.

22. A method of analyzing an image, the method comprising:

receiving, at one or more computer systems, a first image;

applying, with one or more processors associated with the one or more computer systems, a first filter to the first image to create a filtered image;

applying, with the one or more processors associated with the one or more computer systems, a first blurring operator to the filtered image to create a blurred image;

comparing, with the one or more processors associated with the one or more computer systems, each of the filtered image and the blurred image with the first image to identify at least a first portion of the blurred image that is closer to the first image than the filtered image and at least a second portion of the filtered image that is closer to the first image than the blurred image; and creating, with the one or more processors associated with the one or more computer systems, an output image including the first portion of the blurred image and the second portion of the filtered image.

23. The method of claim 22, wherein the blurring operator is adapted to reduce a magnitude of a high spatial frequency component of an image spectrum relative to a magnitude of a low spatial frequency component of the image spectrum.

24. The method of claim 22, wherein comparing each of the filtered image and the blurred image with the first image comprises:

determining, with the one or more processors associated with the one or more computer systems, a first error metric value for a first image element included in the blurred image based on a difference between the first image element and a corresponding second image element included in the first image;

determining, with the one or more processors associated with the one or more computer systems, a second error metric value for a third image element included in the filtered image based on a difference between the third image element and the second image element included in the first image, wherein the first image element in the blurred image corresponds with the second image element included in the filtered image;

determining, with the one or more processors associated with the one or more computer systems, if the first image element or the third image element is closer to the second image element in the first image based on the first and second error metric values;

including, with the one or more processors associated with the one or more computer systems, the first image element in the first portion of the blurred image in response to the first image element being closer to the second image element in the first image; and including, with the one or more processors associated with the one or more computer systems, the third image element in the second portion of the filtered image in response to the third image element being closer to the second image element in the first image.

25. The method of claim 22, comprising:

identifying, with the one or more processors associated with the one or more computer systems, a third portion of the blurred image and a fourth portion of the filtered image having similar deviations from the first image;

blending, with the one or more processors associated with the one or more computer systems, the third portion of the blurred image with the fourth portion of the filtered image to form a blended image portion; and including, with the one or more processors associated with the one or more computer systems, the blended image portion in the output image.

26. The method of claim 22, wherein the first blurring operator includes a Gaussian blurring operator.

27. The method of claim 22, further comprising:

applying, with the one or more processors associated with the one or more computer systems, a second blurring operator to the output image to create a second blurred image;

comparing, with the one or more processors associated with the one or more computer systems, each of the output image and the second blurred image with the first image to identify at least a third portion of the second blurred image that is closer to the first image than the output image and a fourth portion of the output image that is closer to the first image than the second blurred image;

creating, with the one or more processors associated with the one or more computer systems, a second output image including the third portion of the second blurred image and the fourth portion of the output image.

28. The method of claim 27, wherein the first blurring operator is associated with a first neighborhood having a first size and the second blurring operator is associated with a second neighborhood having a second size different than the first size.

29. The method of claim 22, wherein the first filter includes a local histogram-based filter.

30. The method of claim 22, wherein the first filter includes a bilateral filter.

* * * * *